United States Patent
Lee et al.

(10) Patent No.: US 12,554,375 B2
(45) Date of Patent: Feb. 17, 2026

(54) WEARABLE DEVICE FOR RECOGNIZING TOUCH INPUT BY EXTERNAL OBJECT AND METHOD THEREOF

(71) Applicant: Samsung Electronics Co., Ltd., Suwon-si (KR)

(72) Inventors: Sanghun Lee, Suwon-si (KR); Donghyun Yeom, Suwon-si (KR); Sungsoo Choi, Suwon-si (KR); Sungoh Kim, Suwon-si (KR); Jihyun Kim, Suwon-si (KR); Sunggeun Ahn, Suwon-si (KR); Gunhee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 18/428,454

(22) Filed: Jan. 31, 2024

(65) Prior Publication Data
US 2024/0329794 A1    Oct. 3, 2024

Related U.S. Application Data

(63) Continuation of application No. PCT/KR2024/000866, filed on Jan. 17, 2024.

(30) Foreign Application Priority Data

Mar. 28, 2023  (KR) ........................ 10-2023-0040712
May 16, 2023   (KR) ........................ 10-2023-0063246

(51) Int. Cl.
*G06F 3/04815*  (2022.01)
*G02B 27/01*    (2006.01)
(Continued)

(52) U.S. Cl.
CPC ....... *G06F 3/04815* (2013.01); *G02B 27/017* (2013.01); *G06T 19/006* (2013.01); *G06V 40/28* (2022.01)

(58) Field of Classification Search
CPC .......... G06F 3/01; G06F 3/0488; G06F 3/041; G06F 3/0481; G06F 3/0484;
(Continued)

(56) References Cited

U.S. PATENT DOCUMENTS

| | | |
|---|---|---|
| 10,134,189 B2 | 11/2018 | Yamamoto et al. |
| 10,353,532 B1 | 7/2019  | Holz et al. |
| 10,606,553 B2 | 3/2020  | Park et al. |
| 11,663,992 B2 | 5/2023  | Canberk et al. |
| 11,868,517 B2 | 1/2024  | Ishihara et al. |

(Continued)

FOREIGN PATENT DOCUMENTS

| | | |
|---|---|---|
| KR | 10-2014-0120650 A | 10/2014 |
| KR | 10-2016-0093890 A | 8/2016 |

(Continued)

OTHER PUBLICATIONS

International Search Report with Written Opinion and English translation dated Apr. 26, 2024; International Appln. No. PCT/KR2024/000866.

*Primary Examiner* — Rayeez R Chowdhury
(74) *Attorney, Agent, or Firm* — Jefferson IP Law, LLP

(57) ABSTRACT

A wearable device may obtain an image, while a screen is displayed, using a camera. The wearable device may identify a visual object corresponding to an external object from the image. The wearable device may display, at a first location of a portion of the visual object corresponding to a portion of the external object farther than a reference distance from a second surface, a pointer on the screen. The wearable device may recognize the external object contacted on the second surface according to movement from outside the reference distance, as a touch input at a second location identified based on a path of the movement and the first (Continued)

location, and provide feedback with respect to the touch input.

20 Claims, 13 Drawing Sheets

(51) Int. Cl.
*G06T 19/00* (2011.01)
*G06V 40/20* (2022.01)

(58) Field of Classification Search
CPC ........ G06F 3/0346; G06F 3/14; G06F 3/0487; G06F 1/16; G06F 3/00; G06F 3/03; G06F 3/04815; G06F 3/0354; G06F 3/0482; G06F 3/04845; G06F 3/16; G06F 16/583; G06F 3/0362; G06F 3/038; G06F 3/048; G06F 3/04842; G06F 3/147
See application file for complete search history.

(56) References Cited

U.S. PATENT DOCUMENTS

| | | |
|---|---|---|
| 2013/0335321 A1 | 12/2013 | Sugita et al. |
| 2015/0358614 A1* | 12/2015 | Jin ..................... G06F 3/03545 348/49 |
| 2017/0090744 A1 | 3/2017 | Kim |
| 2020/0387214 A1 | 12/2020 | Ravasz et al. |
| 2021/0303258 A1 | 9/2021 | Tanaka |
| 2022/0366871 A1* | 11/2022 | Canberk ................. G06F 3/011 |

FOREIGN PATENT DOCUMENTS

| | | |
|---|---|---|
| KR | 10-2083596 B1 | 3/2020 |
| KR | 10-2099834 B1 | 4/2020 |
| KR | 10-2021-0104886 A | 8/2021 |
| KR | 10-2022-0018559 A | 2/2022 |
| WO | 2018/008096 A1 | 1/2018 |
| WO | 2021/131023 A1 | 7/2021 |

* cited by examiner

WEARABLE DEVICE FOR RECOGNIZING TOUCH INPUT BY EXTERNAL OBJECT AND METHOD THEREOF

CROSS-REFERENCE TO RELATED APPLICATION(S)

This application is a continuation application, claiming priority under § 365 (c), of an International application No. PCT/KR2024/000866, filed on Jan. 17, 2024, which is based on and claims the benefit of a Korean patent application number 10-2023-0040712, filed on Mar. 28, 2023, in the Korean Intellectual Property Office, and of a Korean patent application number 10-2023-0063246, filed on May 16, 2023, in the Korean Intellectual Property Office, the disclosure of each of which is incorporated by reference herein in its entirety.

TECHNICAL FIELD

The disclosure relates to a wearable device for recognizing a touch input by an external object and a method thereof.

BACKGROUND ART

In order to provide an enhanced user experience, an electronic device providing an augmented reality (AR) service and/or a virtual reality (VR) service, which display information generated by computer in association with an external object within the real-world, are being developed. The electronic device may be a wearable device that may be worn by a user. For example, the electronic device may be an AR glasses and/or a head-mounted device (HMD).

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide a wearable device for recognizing a touch input by an external object and a method thereof.

Additional aspects will be set forth in part in the description which follows and, in part, will be apparent from the description, or may be learned by practice of the presented embodiments.

In accordance with an aspect of the disclosure, a wearable device is provided. The wearable device may comprise a housing, memory storing one or more programs, a camera positioned toward a direction different from a direction of the display, and one or more processors in the housing. The one or more programs may include instructions that, when executed by the one or more processors, cause the wearable device to obtain, while a screen is displayed on the display, an image using the camera. The one or more programs may include instructions that, when executed by the one or more processors, cause the wearable device to identify a visual object corresponding to an external object from the image. The one or more programs may include instructions that, when executed by the one or more processors, cause the wearable device to display, at a first location of a portion of the visual object corresponding to a portion of the external object farther than a reference distance from a second surface opposite to the first surface, a pointer with the screen. The one or more programs may include instructions that, when executed by the one or more processors, cause the wearable device to recognize the external object contacted on the second surface according to movement of the external object from outside the reference distance, as a touch input on a second location identified based on a path of the movement and the first location, and provide feedback with respect to the touch input.

In accordance with an aspect of the disclosure, a method performed by a wearable device is provided. The method may comprise obtaining, while a screen is displayed on a display of the wearable device positioned on a first surface of a housing of the wearable device, an image using a camera of the wearable device positioned toward a direction different from a direction of the display. The method may comprise identifying a visual object corresponding to an external object from the image. The method may comprise displaying, at a first location of a portion of the visual object corresponding to a portion of the external object farther than a reference distance from a second surface opposite to the first surface, a pointer on the screen. The method may comprise recognizing the external object contacted on the second surface according to movement of the external object from outside the reference distance, as a touch input on a second location identified based on a path of the movement and the first location, and providing feedback with respect to the touch input.

In accordance with an aspect of the disclosure, one or more non-transitory computer readable storage media storing one or more programs including instructions that, when executed by one or more processors of a wearable device, cause the wearable device to perform operations are provided. The operations may include obtaining, while a screen is displayed on a display of the wearable device positioned on a first surface of a housing of the wearable device, an image using a camera of the wearable device positioned toward a direction different from a direction of the display. The operations may include identifying a visual object corresponding to an external object from the image. The operations may include displaying, at a first location of a portion of the visual object corresponding to a portion of the external object farther than a reference distance from a second surface opposite to the first surface, a pointer on the screen. The operations may include recognizing the external object contacted on the second surface according to movement of the external object from outside the reference distance, as a touch input at a second location identified based on a path of the movement and the first location, and providing feedback with respect to the touch input.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 1A:
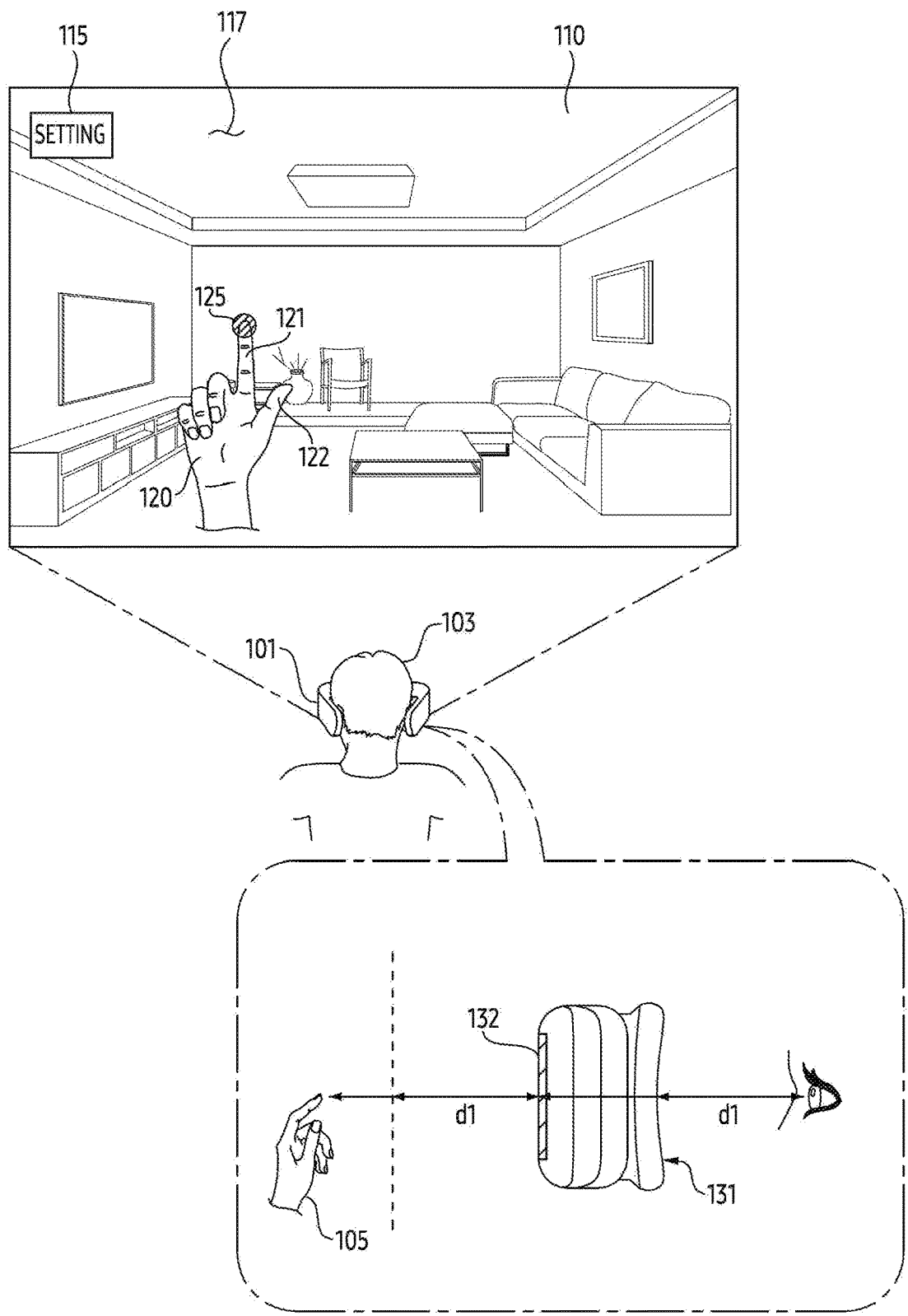
FIG. 1A illustrates an example of a use state of a wearable device, according to an embodiment of the disclosure.
Figure 1B:
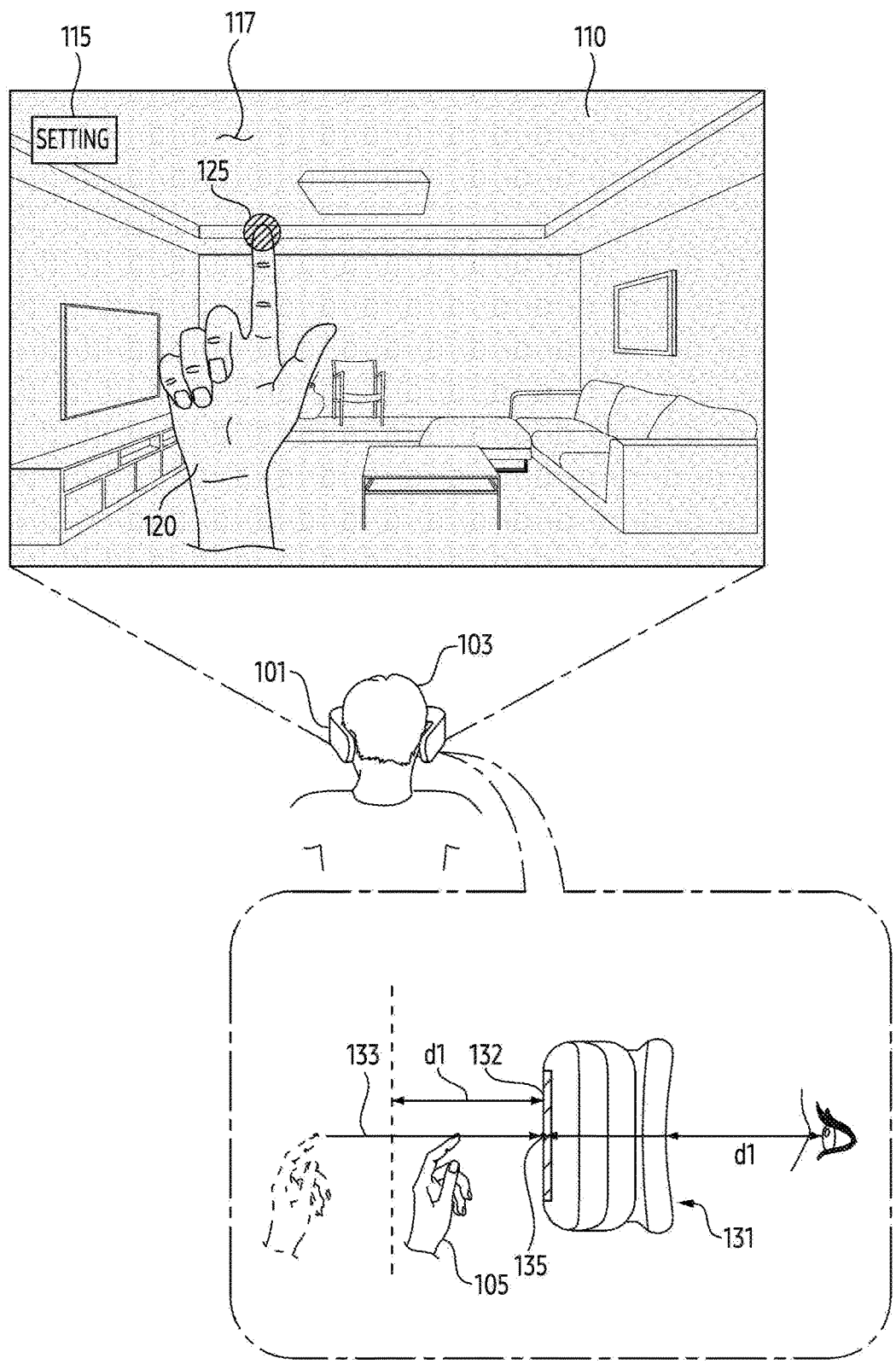
FIG. 1B illustrates an example of a use state of a wearable device, according to an embodiment of the disclosure.

FIG. 1A illustrates an example of a use state of a wearable device, according to an embodiment of the disclosure. FIG. 1B illustrates an example of a use state of a wearable device, according to an embodiment of the disclosure.

Referring to FIGS. 1A and 1B, a wearable device 101 according to an embodiment may include a head-mounted display (HMD) wearable on a head of a user 103. Although an exterior of the wearable device 101 in a form of glasses is illustrated, the embodiment is not limited thereto. An example of a structure of the wearable device 101 wearable on the head of the user 103 is described with reference to FIGS. 6A and 6B and/or 7A and 7B. One or more components included in the wearable device 101 are exemplarily described with reference to FIG. 2.

According to an embodiment, the wearable device 101 (e.g., a wearable device 101 of FIGS. 6A and 6B and/or a wearable device 101 of FIGS. 7A and 7B) may execute a function related to an augmented reality (AR) and/or a mixed reality (MR). Referring to FIGS. 1A and 1B, in a state in which a user wears the wearable device 101, the wearable device 101 may include at least one lens positioned adjacent to the user's eyes. Ambient light passing through a lens of the wearable device 101 (e.g., a lens 630 of FIG. 6B) may be mixed with light emitted from a display of the wearable device 101 (e.g., a display 230 of FIG. 2). A displaying area of the display may be formed in a lens through which ambient light passes. Since the light emitted from the display is mixed with the ambient light and propagated to a user 103 wearing the wearable device 101, the user 103 may see an image that is a mixture of a real object recognized by the ambient light and a virtual object formed by the light emitted from the display.

According to an embodiment, the wearable device 101 may execute a function related to a video see-through (VST) and/or a virtual reality (VR). Referring to FIGS. 1A and 1B, in a state in which the user wears the wearable device 101, the wearable device 101 may include a housing covering eyes of the user 103. The wearable device 101 may include a display positioned on a first surface 131 facing the eye in the state. The wearable device 101 may include a camera positioned on a second surface opposite to the first surface 131. The wearable device 101 may include a camera positioned toward a direction different from a direction of the display positioned on the first surface 131. For example, in the housing of the electronic device, the camera of the wearable device 101 may be positioned toward a direction different from a normal direction of the display (e.g., a direction opposite to the normal direction) or may be exposed to the outside. The wearable device 101 may obtain images including ambient light by using the camera. The wearable device 101 may output the images in the display positioned on the first surface 131 so that a user recognizes the ambient light through the display. A displaying area of the display positioned on the first surface 131 may be formed by one or more pixels included in the display. The wearable device 101 may synthesize a virtual object in images outputted through the display to recognize the virtual object together with the real object recognized by the ambient light.

Referring to FIG. 1A, according to an embodiment, the wearable device 101 may display a screen 110 through the display positioned on the first surface 131. For example, the screen 110 may include an image obtained through a camera exposed through a portion of a second surface 132 opposite to the first surface 131. When displaying the image obtained through the camera, in a VST state, a MR state, and/or an AR state, the wearable device 101 may provide a surrounding environment of the wearable device 101 through at least a portion of the display. For example, the screen 110 may include a screen in which a virtual space (or a virtual reality) is provided by using an application (e.g., a software application). For example, the screen 110 may include a screen in which a virtual space is provided based on information (or data) transmitted from an external electronic device through a communication circuit. For example, when displaying a screen providing the virtual space, the wearable device 101 may be set to a mode for providing a virtual reality, such as a VR mode.

According to an embodiment, the wearable device 101 may obtain an image through a camera while the screen 110 is displayed through the display. The wearable device 101 may identify a visual object 120 corresponding to an external object 105 in the image. For example, the external object 105 may include an input means capable of causing a touch input on the second surface 132. For example, the wearable device 101 may recognize a touch input based on identifying a contact point 135 on the second surface 132. The external object 105 may include a user's hand. For example, the external object 105 may include a digital pen (e.g., a stylus pen). For example, the external object 105 may include a wearable input device (e.g., a touch glove). A type of the external object 105 is not limited. For example, the touch input may include a gesture identified on the second surface 132. For example, the gesture may include drag, pinch-to-zoom, spread, swipe, single-tap, double-tap, and/or flick. However, it is not limited thereto.

For example, the wearable device 101 may identify a distance between the external object 105 and the second surface 132 of the wearable device 101. For example, the wearable device 101 may identify whether the distance exceeds a reference distance d1. The reference distance d1 may be set for switching, identifying, and/or selecting hardware (e.g., a camera 240 and/or a sensor 250 of FIG. 2) for tracking the external object 105. For example, the wearable device 101 may compare a distance between the second surface 132 of the wearable device 101 and the external object 105 to the reference distance d1. Based on the comparison of the distance and the reference distance d1, the wearable device 101 may identify one hardware to be used to identify a location of the external object 105 from among the camera or the sensor. The reference distance d1 may be less than or equal to a first distance capable of identifying the external object 105 by using a sensor (e.g., a touch sensor 252 of FIG. 2). The reference distance d1 may be greater than or equal to a second distance capable of identifying the external object 105 by using a camera (e.g., a camera 240 of FIG. 2).

According to an embodiment, the wearable device 101 may select hardware used to identify the external object 105 from among a camera (e.g., a camera 240 of FIG. 2) or a sensor (e.g., a sensor 250 of FIG. 2), by using the reference distance d1. In a state of identifying the external object 105 spaced apart from the second surface 132 of the wearable device 101 below the reference distance d1, the wearable device 101 may monitor a location of the external object 105 by using a sensor from among a camera or the sensor. In the state of identifying the external object 105 spaced apart from the second surface 132 of the wearable device 101 by exceeding the reference distance d1, the wearable device 101 may monitor a location of the external object 105 by using a camera from among the camera or a sensor.

In an embodiment of FIG. 1A, the reference distance d1 may be substantially equal to a distance between eyes of the user 103 and the first surface 131 on which the display is positioned. For example, the wearable device 101 may identify a portion of the visual object 120 corresponding to a portion of the external object 105 farther than the reference distance d1 from the second surface 132.

According to an embodiment, the wearable device 101 may provide a user experience (e.g., a user experience based on video-see through (VST)) based on an image and/or video of an external space to the user 103 wearing the wearable device 101, by using a display (e.g., the display 230 of FIG. 2) positioned on the first surface 131 of the wearable device 101. In order to provide the user experience, the wearable device 101 may obtain an image and/or video of the external space by using a camera (e.g., a camera 240 of FIG. 2) positioned on the second surface 132 of the wearable device 101. The wearable device 101 may make the user 103 three-dimensionally recognize the external space, by emitting light representing different images based on binocular parallax to the user's two eyes. Spatial impression perceived by the user 103 due to the binocular parallax may be based on a camera positioned on the second surface 132 of the wearable device 101. For example, when the user 103 wearing the wearable device 101 recognizes an external object 105 through an image captured by the camera on the second surface 132, the user 103 may recognize a distance between the second surface 132 and the external object 105 on which the camera is positioned as a distance of the external object 105 spaced apart from the user 103.

According to an embodiment, the wearable device 101 may display a virtual object for interacting with the user 103 on a display positioned on the first surface 131. The user 103 wearing the wearable device 101 may recognize a distance of the virtual object based on the reference distance d1 between the user 103 and the display. In a state that the wearable device 101 displays an image and/or video including the external object 105 together with the virtual object on the display, when the external object 105 is spaced apart from the second surface 132 of the wearable device 101 by the reference distance d1, the user 103 may recognize that distances of the virtual object and the external object 105 match each other as the reference distance d1. According to an embodiment, the wearable device 101 may change visibility (or transparency) of the external object 105 displayed through the display to more accurately identify an input indicating a selection of the virtual object, based on a contact between the second surface 132 and the external object 105. Based on the changed visibility, the wearable device 101 may guide the user 103 to move the external object 105 toward a surface of the second surface 132 in order to select the virtual object.

According to an embodiment, the wearable device 101 may identify an amount of ambient light around the wearable device 101 by using an illuminance sensor. The wearable device 101 may change the reference distance d1 based on sensor data obtained by the illuminance sensor. For example, the wearable device 101 may change the reference distance d1 based on an amount of ambient light around the wearable device 101 by using the illuminance sensor. For example, as the amount of light increases, accuracy for tracking the external object 105 by the camera increases, so the reference distance d1 may be decreased. For example, the wearable device 101 may change the reference distance d1 based on a database including the amount of ambient light and the reference distance d1. For example, the database may be referred to as a mapping table.

Figure 2:
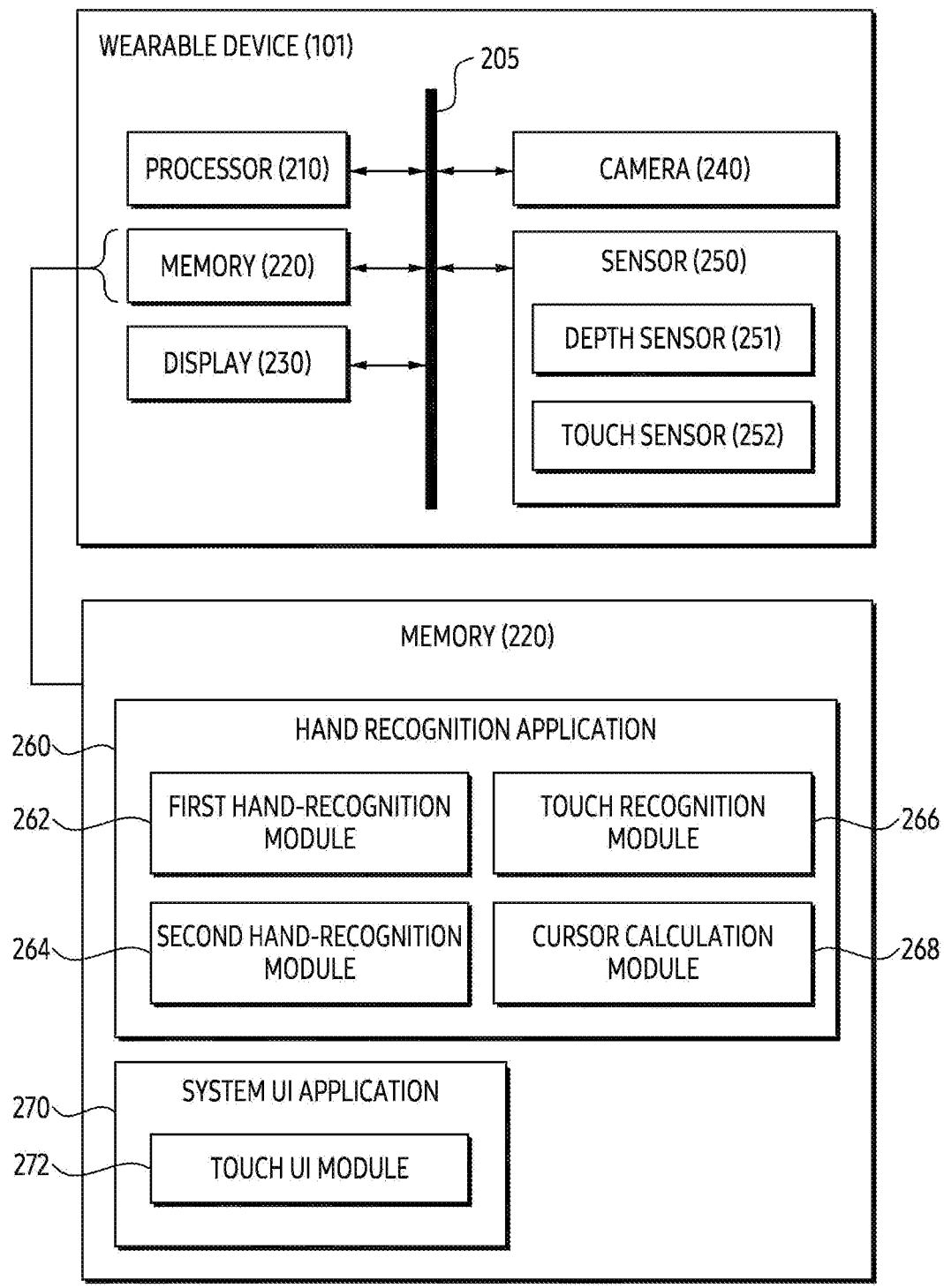
FIG. 2 illustrates an example of a block diagram of a wearable device, according to an embodiment of the disclosure.

According to an embodiment, the wearable device 101 may identify the external object 105 by using a camera (e.g., a camera 240 of FIG. 2) and/or a sensor (e.g., a sensor 250 of FIG. 2). For example, when an event that causes identifying of the external object 105 or is based on a preset cycle occurs, the wearable device 101 may identify the external object 105 by using the camera 240 and/or the sensor 250. For example, the wearable device 101 may identify a portion of the visual object 120 corresponding to a portion of the external object 105 in an image obtained through the camera 240, based on the identification of a portion of the external object 105 farther than the reference distance d1 from the second surface 132. For example, the wearable device 101 may identify a portion of the visual object 120 for displaying the pointer 125. The wearable device 101 may identify a first location of a portion of the visual object 120. For example, the first location may be included in an area in which a portion of the visual object 120 is displayed in the screen 110.

For example, the wearable device 101 may display the pointer 125 based on the first location of the portion of the visual object 120 displayed on the screen 110. For example, a location of the pointer 125 displayed on the screen 110 may be related to the first location. For example, the wearable device 101 may display the pointer 125 at a location where at least a portion overlaps the first location on the screen 110. For example, the pointer 125 may be a visual object for representing a location indicated by an input means. The wearable device 101 may display the pointer 125 together with the screen 110 in the first location of the portion of the visual object 120. For example, the pointer 125 may be represented as a point. For example, the pointer 125 may be represented in a preset shape (e.g., circle, triangle, square, hexagon, octagon, and/or arrow). For example, the pointer 125 may be represented in a form in which the preset shape is filled with preset color. However, it is not limited thereto. For example, the wearable device 101 may identify an input indicating to select a virtual object 115 displayed in the screen 110 by using the pointer 125.

Referring to FIG. 1B, according to an embodiment, the wearable device 101 may identify movement of the external object 105 approaching from outside the reference distance d1 of the second surface 132. For example, the wearable device 101 may identify the external object 105 in contact with the second surface 132. The wearable device 101 may identify a contact point 135 based on the external object 105 on the second surface 132. For example, according to the movement of the external object 105 approaching from outside the reference distance d1 on the second surface 132, the wearable device 101 may recognize the external object 105 contacted on the second surface 132 as a touch input at a second location identified based on the first location and a path 133 of the movement. For example, the path 133 may be a set of locations of portion of the external objects identified while an external object such as a user's finger approaches the second surface. For example, the second location may be a combination (e.g., displacement) of the first location of the external object 105 identified by the camera 240 at a first timing of the wearable device 101 and a movement direction and/or a movement distance of the external object 105 identified by a sensor (e.g., a touch sensor 252 of FIG. 2) after the first timing. The first timing may be a last timing when the wearable device 101 identifies the external object 105 by using a camera. After the first timing, the wearable device 101 may identify the second location by combining a path of the external object 105 identified by using a sensor (e.g., a touch sensor 252 of FIG. 2) different from the camera to the first location at the first timing. For example, the first location and the second location may be the same or different. For example, when identifying the external object 105 farther than the reference distance d1 from the second surface 132, the wearable device 101 may identify the external object 105 by using the camera 240. For example, when identifying the external object 105 within the reference distance d1 from the second surface 132, the wearable device 101 may identify the external object 105 by using the sensor 250 (e.g., a depth sensor, a touch sensor, and/or a hovering sensor).

As described above, according to an embodiment, the wearable device 101 may identify the second location based on the path 133 of the movement of the external object 105 in contact with the second surface 132, according to the first location of the visual object 120 and movement of the external object 105. The wearable device 101 may identify a touch input at the second location. Since the wearable device 101 identifies the touch input at the second location based on the first location and the path 133, a coordinate value of the second location may be different from a coordinate value of the contact point 135 identified on the second surface 132. The wearable device 101 may determine that the touch input occurred at the second location, based on identifying the external object 105 in contact with the second surface 132.

According to an embodiment, the wearable device 101 may display the virtual object 115 on the screen 110. For example, the virtual object 115 may include an object (e.g., button UI (user interface)) capable of interacting with the user 103. For example, the object capable of interacting with the user 103 may include an object executing a function, based on an input of the user 103. For example, an operation of executing the function may include an operation of providing feedback based on the input. In a state in which the wearable device 101 displays an image obtained through a camera (e.g., the camera 240 of FIG. 2) on the second surface 132, the wearable device 101 may display the image as a background 117 within the screen 110, and may display the virtual object 115 by overlapping the image displayed as the background 117.

According to an embodiment, the wearable device 101 may identify a distance between the external object 105 and the wearable device 101 while the screen 110 is displayed through a display. For example, the distance between the external object 105 and the wearable device 101 may include a distance from the second surface 132 of the wearable device 101 to the external object 105. The wearable device 101 may adjust transparency of the background 117 of the screen 110, based on the distance from the second surface 132 to the external object 105. For example, the transparency may be adjusted based on an alpha value. The alpha value may have a value between 0 and 255. For example, the background 117 may be transparent as the alpha value is smaller, and opaque as the alpha value is larger.

According to an embodiment, the wearable device 101 may perform rendering on the screen 110 based on a stack of a plurality of layers. The plurality of layers may correspond to each of an image (e.g., the background 117) displayed by the wearable device 101, the virtual object 115 and/or the pointer 125. For example, operation of adjusting the transparency may include operation of adjusting transparency of a second layer different from a first layer, which is a top layer on which the pointer 125 will be displayed. The second layer may include an image (e.g., an image and/or video displayed on the screen 110 as the background 117) obtained from the camera on the second surface 132. For example, the wearable device 101 may adjust the transparency of the background 117 displayed on the screen, by adjusting the transparency of the second layer. The embodiment is not limited thereto, and the wearable device 101 may change brightness of the second layer according to a distance between the second surface 132 and the external object 105. For example, as the distance decreases, the wearable device 101 may darken the brightness. For example, when the distance is 0, the wearable device 101 may change substantially the brightness to 0 (e.g., a black screen).

For example, the wearable device 101 may reduce the transparency as a distance from the second surface 132 to the external object 105 becomes closer. For example, an operation of reducing the transparency may include an operation of reducing the brightness of the screen 110. For example, the wearable device 101 may increase the transparency as the distance from the second surface 132 to the external object 105 increases.

For example, the wearable device 101 may maintain transparency (or brightness) of the pointer 125 while adjusting the transparency of the screen 110. For example, the wearable device 101 may maintain transparency (or brightness) of the pointer 125 while reducing the transparency of the screen 110. For example, the wearable device 101 may maintain transparency (or brightness) of the pointer 125 while increasing the transparency of the screen 110. However, it is not limited thereto.

As described above, according to an embodiment, the wearable device 101 may display the pointer 125, based on a first location of a portion of the visual object 120. The wearable device 101 may identify a second location based on the first location and a path 133 of movement of the external object 105 corresponding to the visual object 120. In response to identifying that the external object 105 is in contact with the second surface 132, the wearable device 101 may recognize a touch input at the second location displayed on the screen 110, based on the first location (e.g., a location of the external object 105 identified by the camera) and the path (e.g., displacement of the external object 105 identified by the sensor) of movement of the external object 105. The wearable device 101 may provide feedback based on the first location, by recognizing a touch input at the second location based in part on the first location, independently of a location of the external object 105 in contact with the second surface 132.

According to an embodiment, the wearable device 101 may identify an external object corresponding to the user's hand by using an image obtained through the camera 240. For example, the wearable device 101 may identify the user's hand based on a visual object corresponding to the external object. The wearable device 101 may identify feature points included in the user's hand. For example, the feature points may be identified based on a joint and/or a fingertip of the user's hand. For example, the wearable device 101 may assign an identifier to a portion of the feature points.

For example, the wearable device 101 may assign identifiers to each of the user's fingertips based on the feature points. For example, the wearable device 101 may assign a first identifier to a first portion 121 of the visual object 120 corresponding to the user's index finger. For example, the wearable device 101 may assign a second identifier to a second portion 122 of the visual object 120 corresponding to the user's thumb. An example of FIG. 1A describes an example in which an identifier is assigned to a portion of the visual object 120 corresponding to the user's index finger and thumb, but is not limited thereto.

For example, the wearable device 101 may display the pointer 125 based on the identifier. For example, the wearable device 101 may designate an identifier to display the pointer 125 from among identifiers assigned to a portion of the visual object 120. The wearable device 101 may display the pointer 125 based on identifying a portion of the visual object 120 to which the pointer 125 is assigned.

According to an embodiment, the wearable device 101 may determine a location of the pointer 125 based on an identifier assigned to a portion (e.g., the first portion 121 corresponding to the index finger and the second portion 122 corresponding to the thumb) of the external object 105 corresponding to the hand. For example, it is assumed that the wearable device 101 identifies only the first portion 121 from among the second portion 122 of the visual object 120 corresponding to the thumb and the first portion 121 of the visual object 120 corresponding to the index finger, in an image obtained through the camera 240. In the case, the wearable device 101 may assign an identifier to the first portion 121. In the case, after the external object 105 approaches less than the reference distance d1 capable of tracking the external object 105 by the camera 240, the wearable device 101 may identify the external object 105 contacted on a sensor of the second surface 132. For example, when one contact point on the second surface 132 based on one finger is identified, the wearable device 101 may determine that a touch input by the contact point is generated by the first portion 121 to which the identifier is assigned. For example, when identifying a plurality of contact points on the second surface 132 based on a plurality of fingers, the wearable device 101 may determine that a touch input by the contact points is generated by another portion (e.g., the second portion 122) of the external object 105 and the first portion 121 to which the identifier is assigned.

For example, the wearable device 101 may estimate the touch input by the second portion 122 based on the first identifier assigned to the first portion 121. For example, in a state in which a hand with only index finger spread (e.g., the external object 105) is identified based on the visual object 120 of the image identified by the camera, the wearable device 101 may assign an identifier to the first portion 121 of the visual object 120 corresponding to the index finger. Within the example, in case that thumb is additionally spread at the hand that faces toward the second surface 132 and approaches less than the reference distance d1, the wearable device 101 may identify that the thumb different from the index finger to which the identifier is assigned is unfolded, based on a sensor (e.g., the touch sensor 252 of FIG. 2). Based on identifying the thumb, the wearable device 101 may assign another identifier which is different from the identifier assigned to the index finger, to the thumb. Based on the other identifier, the wearable device 101 may identify a portion of the external object 105 in contact with the second surface 132. For example, the wearable device 101 may identify a portion of the external object 105 in contact with the second surface 132, among the thumb and/or the index finger. The wearable device 101 may display a pointer based on the portion of the external object 105 in contact with the second surface 132.

As described above, according to an embodiment, the wearable device 101 may identify one of a plurality of touch inputs based on an identifier. The wearable device 101 may identify one of the plurality of touch inputs based on the identifier and provide feedback with respect to the plurality of touch inputs. The wearable device 101 may provide feedback with respect to the plurality of touch inputs based on the identifier.

FIG. 2 illustrates an example of a block diagram of a wearable device, according to an embodiment of the disclosure. A wearable device 101 of FIG. 2 may include the wearable device 101 of FIGS. 1A and/or 1B.

Referring to FIG. 2, according to an embodiment, the wearable device 101 may include at least one of a processor 210, memory 220, a display 230, a camera 240, or a sensor 250. The processor 210, the memory 220, the display 230, the camera 240, and the sensor 250 are electronically and/or operably coupled with each other by an electronical component such as a communication bus 205. Hereinafter, the operational coupling of hardware may mean that a direct or indirect connection between hardware is established by wire or wirelessly, so that a second hardware is controlled by a first hardware among the hardware. Although illustrated based on different blocks, embodiments are not limited thereto. A portion of the hardware of FIG. 2 may be included in a single integrated circuit such as a system on a chip (SoC). The type and/or number of hardware included in the wearable device 101 is not limited to those illustrated in FIG. 2. For example, the wearable device 101 may include only a portion of the hardware illustrated in FIG. 2.

In an embodiment, the wearable device 101 may include hardware for processing data based on one or more instructions. Hardware for processing data may include the processor 210, which may be one or more processors that process any of the functions or operations described herein. For example, the hardware for processing data may include an application processor (AP, e.g. a central processing unit (CPU)), a communication processor (CP) (e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), an SoC, an integrated circuit (IC), an arithmetical and logical unit (ALU), a floating point unit (FPU), programmable logic unit (PLU), a field programmable gate array (FPGA), or the like. The processor 210 may have a structure of a single-core processor, or a structure of a multi-core processor such as a dual core, a quad core, a hexa core, or an octa core. For example, the wearable device 101 may include the processor 210 in a housing.

According to an embodiment, the memory 220 of the wearable device 101 may include a hardware component for storing data and/or one or more programs including instructions inputted and/or outputted to the processor 210 of the wearable device 101. It should be appreciated that the blocks in each flowchart and combinations of the flowcharts may be performed by the one or more programs including the instructions. The memory 220 may be single or plural, with the entirety of the one or more programs being stored in the single memory or the one or more programs being divided with different portions stored in different of the plural memories. The memory 220 may include a volatile memory such as a random-access memory (RAM) and/or a non-volatile memory such as a read-only memory (ROM). For example, the volatile memory may include at least one of a dynamic RAM (DRAM), a static RAM (SRAM), a Cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC).

For example, the wearable device 101 may execute an application for displaying a pointer based on identifying an event. For example, the event may be generated by identifying the user's palm. For example, the event may be generated by identification of a preset gesture on a touch panel.

According to an embodiment, the display 230 of the wearable device 101 may output visualized information to a user. For example, the display 230 may be controlled by the processor 210 including a circuit such as a graphic processing unit (GPU) to output visualized information to the user. The display 230 may include a flat panel display (FPD) and/or an electronic paper. The FPD may include a liquid crystal display (LCD), a plasma display panel (PDP), and/or one or more light emitting diode (LED). The LED may include an organic LED (OLED). For example, the display 230 may be positioned on a first surface (e.g., the first surface 131 of FIGS. 1A and/or 1B) of a housing of the wearable device 101. For example, the first surface may face a direction toward the user while the user wears the wearable device 101.

According to an embodiment, the camera 240 of the wearable device 101 may include a lens assembly, a flash, or an image sensor. The lens assembly may collect light emitted from a subject which is a target of image capture. The lens assembly may include one or more lenses. According to an embodiment, the camera 240 may include a plurality of lens assemblies. For example, a portion of the plurality of lens assemblies may have the same lens properties (e.g., angle of view, focal length, autofocus, f number, or optical zoom), or at least one lens assembly may have one or more lens properties different from those of other lens assemblies. The lens assembly may include a wide-angle lens or a telephoto lens. For example, the flash of the camera 240 may emit light used to enhance light emitted or reflected from a subject. According to an embodiment, the flash may include one or more light emitting diodes (e.g., a red-green-blue (RGB) LED, a white LED, an inflamed LED, or an ultraviolet LED), or a xenon lamp. For example, an image sensor may obtain an image corresponding to the subject, by converting light emitted or reflected from the subject and transmitted through the lens assembly into an electrical signal. According to an embodiment, an image sensor may include a selected image sensor, a plurality of image sensors with the same properties, or a plurality of image sensors with different properties, from among image sensors with different properties, such as an RGB sensor, a black and white (BW) sensor, an IR sensor, or an UV sensor. Each image sensor included in the image sensor may be implemented by using, for example, a charged coupled device (CCD) sensor or a complementary metal oxide semiconductor (CMOS) sensor. According to an embodiment, the wearable device 101 may include a plurality of cameras 240 having different properties or functions. For example, at least one of the plurality of cameras 240 may be a wide-angle camera, and another may be a telephoto camera. For example, the camera 240 may be exposed through a portion of a second surface (e.g., the second surface 132 of FIGS. 1A and/or 1B) opposite to a first surface on which a display is positioned. For example, the camera 240 may obtain an image related to surrounding environment of the wearable device 101. The wearable device 101 may display an image obtained through the camera 240 on a screen. For example, the wearable device 101 may identify a visual object corresponding to an external object from the image obtained through the camera 240.

According to an embodiment, the wearable device 101 may include the sensor 250. For example, the sensor 250 of the wearable device 101 may include a depth sensor 251 and/or a touch sensor 252. For example, the wearable device 101 may identify an external object in a direction in which the second surface (e.g., the second surface 132 of FIGS. 1A and/or 1B) faces based on the depth sensor 251. For example, the depth sensor 251 may include a time-of-flight (ToF) sensor and/or a light detection and ranging (LiDAR) sensor. The wearable device 101 may identify an external object using the depth sensor 251. For example, the wearable device 101 may identify an external object of a direction in which the second surface opposite to the first surface where the display 230 of the wearable device 101 is positioned faces, by using the depth sensor 251. For example, the wearable device 101 may identify a distance from the second surface to the external object by using the depth sensor 251.

For example, the touch sensor 252 of the wearable device 101 may include a capacitive touch sensor and/or a resistive touch sensor. For example, the touch sensor 252 may include a hovering sensor. For example, the touch sensor 252 may be referred to as a touch sensor panel (TSP). However, it is not limited thereto. For example, the hovering sensor may be a sensor for identifying an external object spaced apart from the second surface of the housing of the wearable device 101. According to an embodiment, the processor 210 of the wearable device 101 may identify an external object in contact with the housing of the wearable device 101, based on data of the touch sensor 252. The wearable device 101 may identify a contact point in which the external object is in contact on the second surface. The processor 210 may provide feedback with respect to the touch input based on recognizing the touch input. The feedback with respect to the touch input may include an operation of executing an operation related to a virtual object (or a visual object) by the virtual object (or the visual object) identified by the touch input.

Referring to FIG. 2, according to an embodiment, programs executed by the wearable device 101 (e.g., a hand recognition application 260 and/or a system UI application 270) are illustrated as different blocks within the memory 220. The processor 210 of the wearable device 101 may control the camera 240 and/or the sensor 250 by executing programs stored in the memory 220, in order to track and/or monitor an external object (e.g., the external object 105 of FIGS. 1A and 1B) including the hand. Referring to FIG. 2, a function and/or a sub-routine included in the program stored in the memory 220 are illustrated separately according to information transmitted between the functions and/or the sub-routines.

Referring to FIG. 2, the processor 210 of the wearable device 101 may control the camera 240 and/or the sensor 250 based on execution of the hand recognition application 260 to identify an external object (e.g., the external object 105 of FIGS. 1A and 1B) including a hand. The processor 210 may control the camera 240 based on execution of the first hand-recognition module 262, which is a sub-routine included in the hand recognition application 260. In a state in which the first hand-recognition module 262 is executed, the processor 210 may identify an external object including a hand from an image of the camera 240. For example, the processor 210 may identify a coordinate of fingertip and one or more landmarks (or feature points) included in a finger from the image. Identifying the external object by the processor 210 using the image may depend on a minimum focal length of the camera 240. For example, when a distance between the external object and the camera 240 is less than the minimum focal length, probability that the processor 210 identifies the external object based on the execution of the first hand-recognition module 262 may be reduced. The minimum focal length may correspond to the reference distance d1 of FIGS. 1A and 1B. For example, the processor 210 may identify an external object spaced apart from the camera 240 by exceeding the reference distance d1, based on the first hand-recognition module 262.

Referring to FIG. 2, the processor 210 may identify an external object including a hand based on data of the touch sensor 252, based on execution of a second hand-recognition module 264, which is a sub-routine included in the hand recognition application 260. For example, the processor 210 may identify an external object spaced apart from a surface (e.g., the second surface 132 of FIGS. 1A and 1B) of the wearable device 101 below the reference distance d1, based on the second hand-recognition module 264.

Referring to FIG. 2, the processor 210 may identify an external object in contact with a surface (e.g., the second surface 132 of FIGS. 1A and 1B) of the wearable device 101 related to the touch sensor 252, based on execution of a touch recognition module 266, which is a sub-routine included in the hand recognition application 260. For example, the processor 210 may identify an external object in contact with a surface of the wearable device 101 by controlling the touch sensor 252, based on the execution of the touch recognition module 266. The processor 210 may identify a location and/or a coordinate of at least one contact point of the external object contacted on the one surface, based on identifying the external object contacted on the one surface.

Referring to FIG. 2, the processor 210 may determine a location of a pointer (e.g., the pointer 125 of FIGS. 1A and 1B), based on execution of a cursor calculation module 268, which is a sub-routine included in the hand recognition application 260. The processor 210 may use the determined location of the pointer to execution of a touch UI module 272, which is a sub-routine included in a system UI application 270. Based on the execution of the touch UI module 272, the processor 210 may identify a touch input based on a pointer positioned at the location. In an embodiment, the processor 210 may display a UI (e.g., a touch UI) in which opacity and/or brightness of an image obtained by the camera 240 is adjusted, based on the execution of the touch UI module 272. The processor 210 may display the touch UI, in a state of identifying an external object (e.g., hand) including a palm, which approaches toward the second surface 132 of the wearable device 101 based on the execution of the hand recognition application 260 and has a direction toward the second surface 132.

For example, while the external object approaches the second surface 132 of the wearable device 101, the wearable device 101 may identify an external object by using the sensor 250. For example, since the visual object may not be identified due to formation of a shadow area on the external object while the external object approaches the wearable device 101, the wearable device 101 may identify an external object by using the sensor 250.

According to an embodiment, the wearable device 101 may include a display 230 positioned on a first surface of a housing. The first surface of the housing may be a direction facing the user while the wearable device 101 is worn on the user. The wearable device 101 may display a screen (e.g., the screen 110 of FIGS. 1A and/or 1B) through the display 230. The wearable device 101 may obtain an image through the camera 240 while the screen is displayed through the display 230. The wearable device 101 may identify a visual object (e.g., the visual object 120 of FIGS. 1A and/or 1B) corresponding to an external object (e.g., the external object 105 of FIGS. 1A and/or 1B) from the image.

For example, the wearable device 101 may identify a first location of a portion of a visual object corresponding to a portion of an external object farther than a reference distance from a second surface opposite to a first surface. The wearable device 101 may display a pointer (e.g., the pointer 125 of FIGS. 1A and/or 1B) together with a screen within the first location of the portion of the visual object. For example, the pointer may be displayed on a top layer from among a plurality of layers included in the screen. The top layer may be different from a layer on which an image (e.g., the background 117 of FIG. 1A) and/or video obtained from the camera 240 are displayed. For example, according to movement of an external object approaching from outside the reference distance on the second surface, the wearable device 101 may identify a second location of a contact, in response to the external object contacted on the second surface. For example, the wearable device 101 may identify the second location based on sensor data obtained through the sensor 250. The wearable device 101 may convert the second location into a third location based on the first location and a path of the movement. The wearable device 101 may recognize the external object contacted on the second surface as a touch input with respect to the third location. For example, the first location and the third location may be locations of a pointer displayed on the screen, and the second location may be a location where an external object is contacted on the second surface. For example, a first coordinate value (e.g., a coordinate value in a screen of a pointer displayed in the screen) of the third location and a second coordinate value (e.g., a coordinate value identified from the touch sensor 252 by the external object contacted on the second surface) of the second location may be different. The wearable device 101 may convert the second coordinate value of the second location into the first coordinate value of the third location based on a path of movement of the external object. The wearable device 101 may identify a touch input at a point in which the first coordinate value is converted.

As described above, according to an embodiment, the wearable device 101 may identify an external object while the screen 110 is displayed through the display 230. For example, in the image obtained through the camera 240, the wearable device 101 may identify a visual object corresponding to the external object or identify the external object using the sensor 250. The wearable device 101 may display a pointer based on a portion of a visual object corresponding to the portion of the external object. The wearable device 101 may identify movement of the external object while displaying the pointer. The wearable device 101 may detect the external object by using the sensor 250, based on the external object identified within the reference distance. The wearable device 101 may detect a portion of the external object by using the sensor 250. The wearable device 101 may display a pointer in the screen, based on a location where the portion of the external object is detected by using the sensor 250. The wearable device 101 may smoothly represent movement of the pointer within the screen, by displaying the pointer based on the portion of the visual object and the portion of the external object.

Figure 3A:
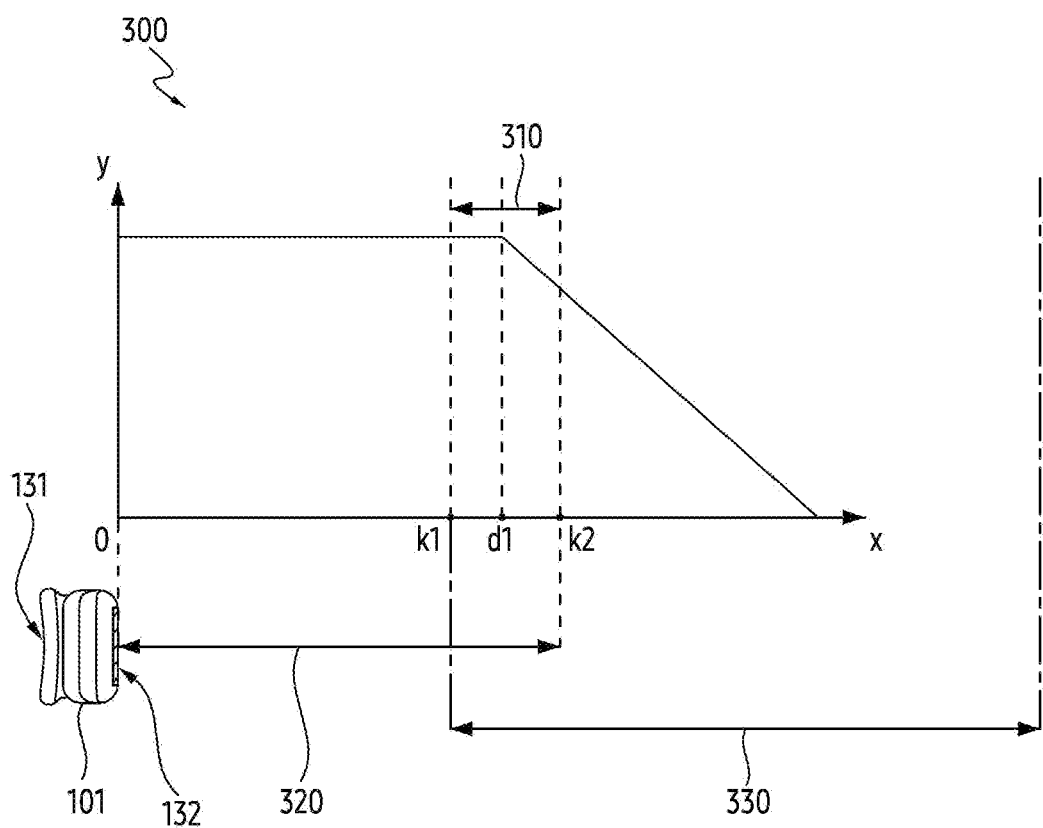
FIGS. 3A and 3B illustrate an example of hardware components used to identify an external object based on a distance, according to an embodiment of the disclosure.
Figure 3B:
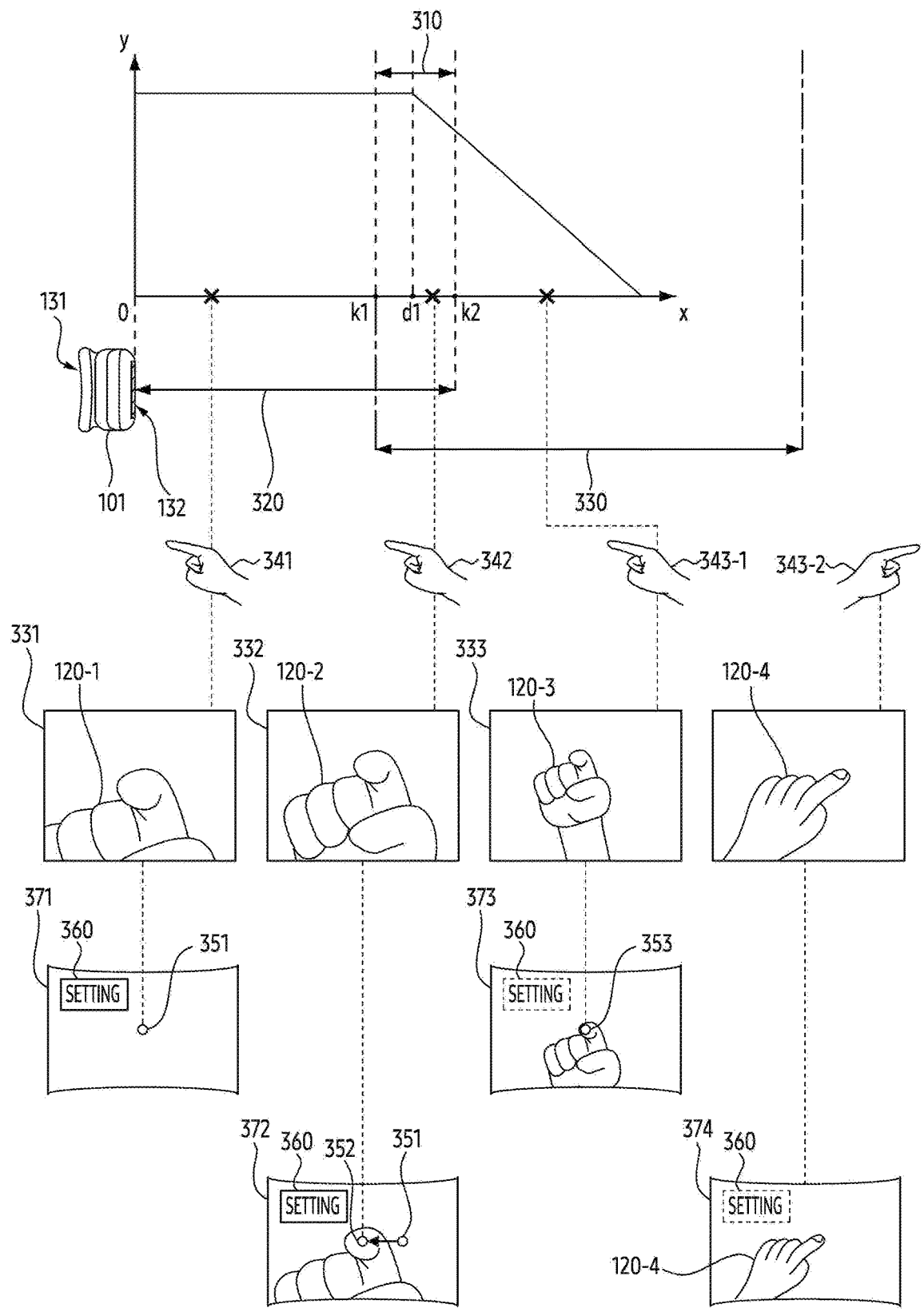

FIGS. 3A and 3B illustrate an example of hardware components used to identify an external object based on a distance, according to an embodiment of the disclosure. A wearable device 101 of FIGS. 3A and 3B may include the wearable device 101 of FIGS. 1A, 1B, and/or 2. Operations of FIGS. 3A and 3B may be performed by the processor 210 of FIG. 2.

Referring to FIG. 3A, x-axis of a graph 300 may be a distance between the wearable device 101 and an external object (e.g., the external object 105 of FIGS. 1A and/or 1B). For example, the distance between the wearable device 101 and the external object may include a distance from a second surface 132 (e.g., a second surface 132 opposite to a first surface 131 on which a display is positioned) of a housing of the wearable device 101 to the external object. Y-axis of the graph 300 may be related to opacity of a screen (e.g., the screen 110 of FIGS. 1A and/or 1B). The opacity may be adjusted based on an alpha value. For example, the opacity may increase as the alpha value increases, and the opacity may decrease as the alpha value decreases.

According to an embodiment, the wearable device 101 may identify an external object in a second range 330 partially overlapping a first range 320, by using an image obtained through a camera (e.g., the camera 240 of FIG. 2). For example, the second range 330 may include a range capable of detecting a visual object corresponding to an external object within an image obtained through a camera. For example, the second range 330 may include a distance farther than a first distance k1 from the second surface 132 of the wearable device 101. For example, the first range 320 may include a range capable of detecting an external objects by using a sensor (e.g., the sensor 250 of FIG. 2). For example, the first range 320 may include within a distance spaced apart from the second surface 132 of the wearable device 101 by a second distance k2.

For example, the first range 320 and the second range 330 may overlap at least partially. For example, a range 310 in which the first range 320 and the second range 330 overlap at least partially may be referred to as a transition area. The reference distance d1 may be included in the transition area. In the overlapping range 310, the wearable device 101 may identify a location of a portion of an external object (e.g., a user's fingertip) based on a camera and a sensor. For example, in the overlapping range 310, while the wearable device 101 displays a pointer using an image obtained through a camera, the wearable device 101 may identify a first coordinate value of a portion of an external object hovered or contacted on the second surface 132 based on the sensor. When the external object is hovered on the second surface 132, the first coordinate value may correspond to any one point of the second surface 132, which is closest to the external object. When the external object is contacted on the second surface 132, the first coordinate value may correspond to a point at which the external object is contacted on the second surface 132. Based on identifying the external object hovered or contacted on the second surface 132, the wearable device 101 may obtain a second coordinate value in which the pointer will be displayed based on a first coordinate value identified by the sensor and a location of the external object identified by the camera. While displaying the pointer based on the second coordinate value, the wearable device 101 may track the location of the external object identified within the reference distance d1 using the sensor.

According to an embodiment, the wearable device 101 may identify movement of an external object approaching from outside the reference distance d1 on the second surface 132 by using the camera, and identify the external object by using the sensor based on the location where the movement of the external object was last identified by using the camera. For example, the wearable device 101 may display a pointer together with a screen, based on movement of a visual object corresponding to the movement of the external object approaching from outside the reference distance d1 on the second surface 132. The wearable device 101 may convert a first location where the external object is identified into a second location of a pointer displayed together with a screen, based on identifying the external object at a second distance k2 from the second surface 132 by using a sensor.

According to an embodiment, the wearable device 101 may adjust opacity of the screen based on a distance between the second surface 132 and the external object. Referring to an example of opacity indicated by the graph 300, the wearable device 101 may increase the opacity of the screen as the external object is closer to the second surface 132. The wearable device 101 may reduce the opacity of the screen based on identifying an external object spaced apart farther than the reference distance d1 from the second surface 132. For example, when the opacity of the screen (e.g., the background 117 of FIGS. 1A and 1B) increases or decreases, the wearable device 101 may maintain transparency of virtual objects (e.g., a button such as setting button) that require a user input. In an embodiment, the wearable device 101 may change opacity of the pointer displayed on the screen, according to the distance of the external object.

Referring to FIG. 3B, screens (e.g., a first screen 371 to a fourth screen 374) displayed according to a distance between the wearable device 101 and an external object (e.g., a user's hand) by the wearable device 101 are exemplarily illustrated. Referring to FIG. 3B, when a distance between the external object 341 and the second surface 132 of the wearable device 101 is included within the first range 320, the wearable device 101 may cease to display a first image 331 obtained by a camera (e.g., the camera 240 of FIG. 2) positioned on the second surface 132 on a first screen 371. For example, the wearable device 101 may adjust visibility of the first image 331 based on opacity indicated by the graph 300 of FIG. 3A.

Referring to the first image 331 of FIG. 3B, as the external object 341 is positioned closer to the second surface 132, a size of a visual object 120-1 within the first image 331 corresponding to the external object 341 within the first image 331 may increase. Ambient light facing to the camera of the second surface 132 may be blocked by the external object 341 close to the second surface 132. Since the ambient light facing to the camera is blocked by the external object 341, brightness of the first image 331 may decrease as the external object 341 is positioned closer to the second surface 132. For example, brightness of the first image 331 may be darker than other images (e.g., a second image 332 to a third image 333).

Referring to FIG. 3B, in a state in which the external object 341 included in the first range 320 is identified, the wearable device 101 may display the first screen 371 independently of the first image 331. For example, the wearable device 101 may display a pointer 351 having a location related to the virtual object 360 and the external object 341 on the first screen 371, and may not display the first image 331. For example, the wearable device 101 may display the first screen 371 having a background color of preset color (e.g., black) replacing the first image 331. The opacity of the virtual object 360 and/or the pointer 351 displayed in the first screen 371 may have a maximum value in a state in which the external object 341 included in the first range 320 is identified.

Referring to FIG. 3B, as the external object moves away from the wearable device 101, the wearable device 101 may increase visibility of an image for an external space in a screen. For example, in a state of identifying the external object 342 included in a transition area between the first range 320 and the second range 330, the wearable device 101 may display a second image 332 corresponding to the external object 342 on the second screen 372. In the transition area, as the external object moves away from the wearable device 101, the wearable device 101 may increase visibility of the second image 332 within the second screen 372. For example, as the external object 342 moves away from the wearable device 101, brightness of the second image 332 may increase, or opacity of the second image 332 may decrease. The wearable device 101 may display the pointer 352 in the second screen 372 based on a location of a visual object 120-2, based on identifying the visual object 120-2 corresponding to the external object 342 based on the second image 332.

Referring to FIG. 3B, in a state in which an external object 343-1 included in the second range 330 is identified, the wearable device 101 may display a third screen 373 including a third image 333 corresponding to the external object 343-1. In the third screen 373, the wearable device 101 may display the third screen 373 in which the third image 333, the virtual object 360, and the pointer 353 are combined, by adjusting opacity of the virtual object 360 and/or the pointer 353. A location of the pointer 353 in the third screen 373 is identified in the third image 333 and may correspond to a location of the visual object 120-3 corresponding to the external object 343-1.

According to an embodiment, displaying the pointer 353 by the wearable device 101 may be related to a direction (e.g., a direction of the palm) of an external object identified by the camera of the wearable device 101. For example, when external objects 341, 342, and 343-1 in which a direction of palm faces the second surface 132 of the wearable device 101 are identified, the wearable device 101 may display pointers 351, 352, and 353 in the screen based on the external objects 341, 342, and 343-1. For example, when a direction of palm faces a direction opposite to the second surface 132 of the wearable device 101 like the external object 343-2, the wearable device 101 may cease displaying the pointer with overlapping the visual object 120-4 corresponding to the external object 343-2 like the fourth screen 374.

As described above, according to an embodiment, the wearable device 101 may adjust opacity of a screen based on a distance from the second surface 132 of the wearable device 101 to an external object. The wearable device 101 may enhance convenience of users to select virtual objects displayed on a screen, by adjusting opacity of the screen based on the distance from the second surface 132 to the external object and maintaining display of virtual objects.

Figure 4:
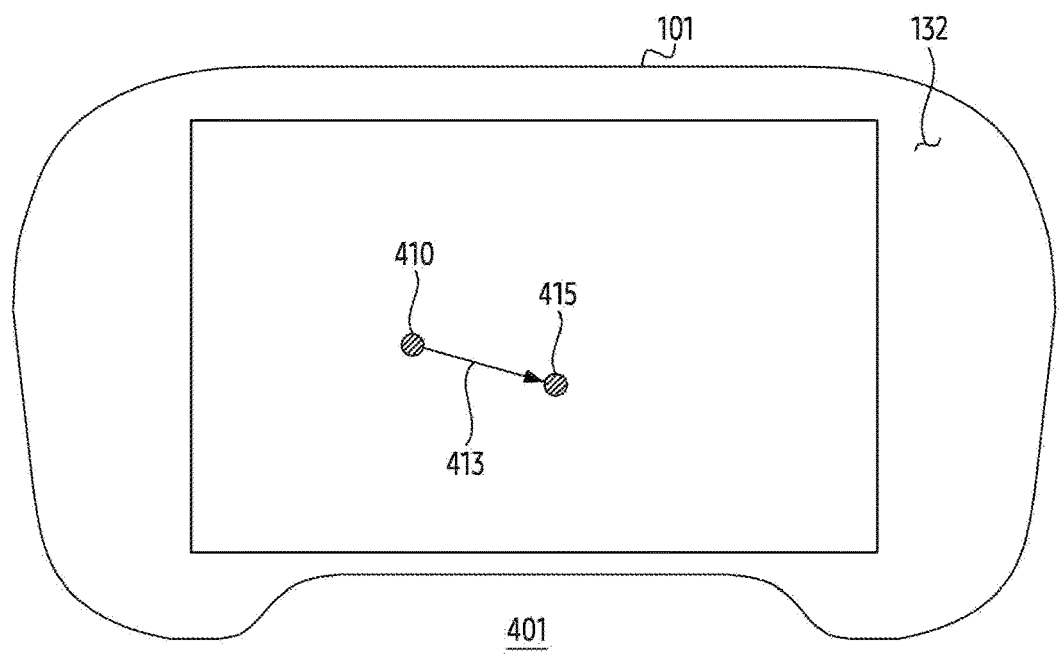
FIG. 4 illustrates an example of a wearable device displaying a pointer, according to an embodiment of the disclosure.
Figure 4:
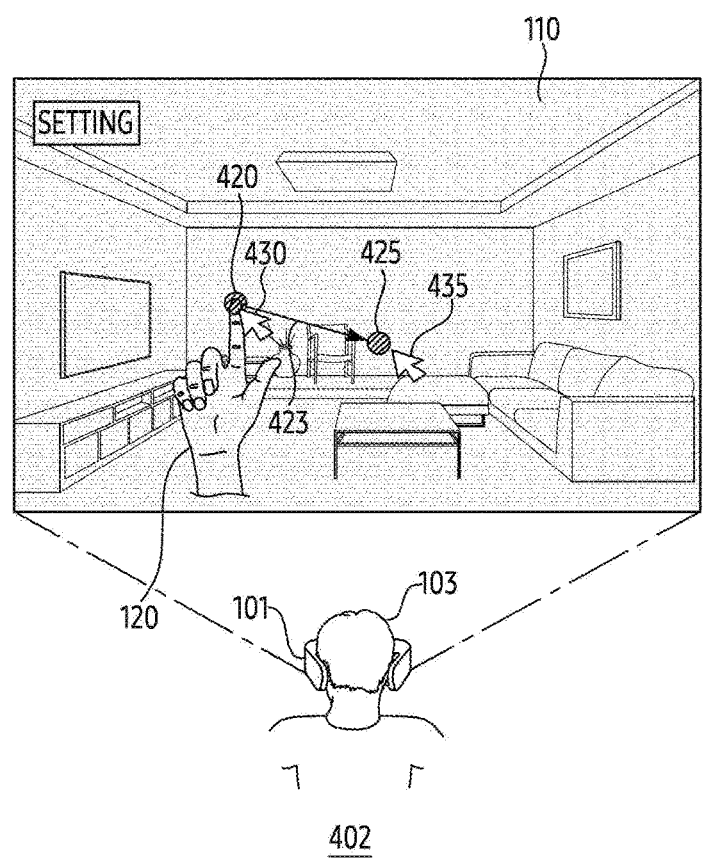

FIG. 4 illustrates an example of a wearable device displaying a pointer, according to an embodiment of the disclosure. A wearable device 101 of FIG. 4 may include the wearable device 101 of FIGS. 1A, 1B, 2, and/or 3A and 3B. Operations of FIG. 4 may be performed by the processor 210 of FIG. 2.

A first example 401 of FIG. 4 may be an example representing a location of an external object identified on a second surface (e.g., the second surface 132 of FIGS. 1A and/or 1B) opposite to a first surface (e.g., the first surface 131 of FIGS. 1A and/or 1B) on which a display (e.g., the display 230 of FIG. 2) of the wearable device 101 is positioned. A second example 402 of FIG. 4 may be an example of a screen 110 displayed through a display of the wearable device 101. The first example 401 and/or the second example 402 of FIG. 4 may be an example, in which an external object is identified in the overlapping range 310 of FIGS. 3A and 3B.

Referring to the second example 402 of FIG. 4, according to an embodiment, the wearable device 101 may obtain an image through the camera while displaying the screen 110 through a display. The wearable device 101 may identify a visual object 120 corresponding to an external object in the image. The wearable device 101 may identify a first location 420 of a portion of the visual object 120. The wearable device 101 may display a pointer 430 based on identifying the first location 420 of the portion of the visual object 120.

Referring to the first example 401, while displaying the pointer 430 based on the first location 420, the wearable device 101 may identify a second location 410 of an external object by using a sensor (e.g., the sensor 250 of FIG. 2). The wearable device 101 may obtain a first coordinate value of the first location 420 and a second coordinate value of the second location 410. For example, the first coordinate value of the first location 420 may be represented as (a2, b2). For example, the second coordinate value of the second location 410 may be represented as (a1, b1). The wearable device 101 may change the first coordinate value corresponding to the pointer 430, based on movement of the external object that is measured by the sensor and started from the second coordinate value. For example, the wearable device 101 may combine displacement of the external object, which start from the second coordinate value (a2, b2) corresponding to a location of an external object identified by using the sensor, to the first coordinate value (a1, b1) of the first location 420 of a portion of a visual object. The wearable device 101 may identify a location of an external object on the second surface, based on the converted second coordinate value. The wearable device 101 may display the pointer 430 based on the displacement combined to the first coordinate value.

According to an embodiment, the wearable device 101 may identify movement of an external object within a reference distance (e.g., the reference distance d1 of FIGS. 3A and/or 3B) from the second surface by using a sensor. The wearable device 101 may identify a path 413 of the movement of the external object within a reference distance from the second surface. For example, the wearable device 101 may identify the first path 413 of an external object moved from the second location 410 to a third location 415. The wearable device 101 may change a location where the pointer 430 is displayed, based on the first path 413 of the external object moved from the second location 410 to the third location 415. For example, the wearable device 101 may display a pointer 435 moved from the first location 420 to a fourth location 425 along a second path 423, based on the first path 413 of the external object moved from the second location 410 to the third location 415. For example, the first path 413 and the second path 423 may have substantially the same direction and/or length. For example, the third coordinate value corresponding to the third location 415 of the external object on the second surface and the fourth coordinate value corresponding to the fourth location 425 of the pointer in the screen 110 may be substantially the same value.

As described above, according to an embodiment, the wearable device 101 may change the second coordinate value of the second location 410 based on the first location 420 of the portion of the visual object and identify the external object using the sensor. Based on the changed coordinate value, the wearable device 101 may smoothly display movement of the pointer within the screen 110, by displaying a pointer (e.g., the pointer 430 or the pointer 435) at a location where the external object is identified by using the sensor.

Figure 5:
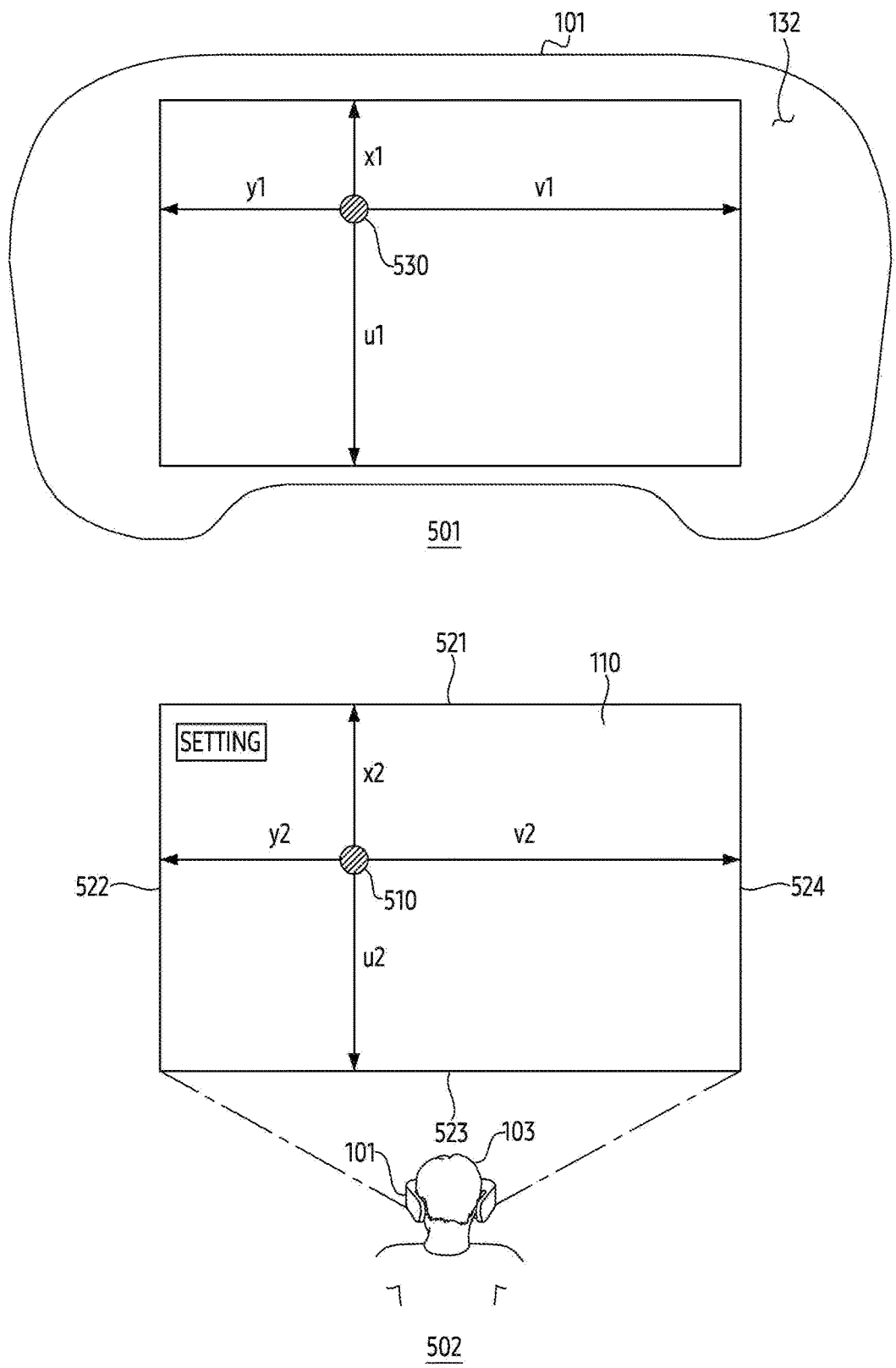
FIG. 5 illustrates an example of a wearable device displaying a pointer, according to an embodiment of the disclosure.

FIG. 5 illustrates an example of a wearable device displaying a pointer, according to an embodiment of the disclosure. A wearable device 101 of FIG. 5 may include the wearable device 101 of FIGS. 1A, 1B, 2, 3A, 3B, and/or 4. Operations of FIG. 5 may be performed by the processor 210 of FIG. 2.

A third example 501 of FIG. 5 may be an example indicating a location of an external object identified on a second surface (e.g., the second surface 132 of FIGS. 1A and/or 1B) opposite to a first surface (e.g., the first surface 131 of FIGS. 1A and/or 1B) on which a display (e.g., the display 230 of FIG. 2) of the wearable device 101 is positioned. A fourth example 502 of FIG. 5 may be an example of a screen 110 displayed through a display of the wearable device 101. The third example 501 and/or the fourth example 502 of FIG. 5 may be an example, in which an external object is identified in the first range 320 of FIGS. 3A and/or 3B.

Referring to FIG. 5, the third example 501 illustrates a location 530 of the external object identified by a sensor (e.g., the sensor 250 of FIG. 2) at a timing when a distance between a second surface 132 of the wearable device 101 and an external object (e.g., a hand of a user 103) is less than a reference distance d1. The fourth example 504 is an example of a screen 110 including a pointer 510, which is displayed by the wearable device 101 at the timing and is displayed based on a location of a last identified external object based on an image obtained by a camera (e.g., the camera 240 of FIG. 2).

Referring to the fourth example 502, according to an embodiment, the wearable device 101 may display a pointer 510 based on a portion of a visual object corresponding to a portion of the external object within the screen 110. Referring to the third example 501, the wearable device 101 may identify an external object by using a sensor while displaying the pointer 510. For example, the wearable device 101 may identify a first coordinate value corresponding to the portion of the external object by using a sensor. For example, the first coordinate value may correspond to a location of a pointer corresponding to a portion of an external object displayed in the screen. For example, the first coordinate value may be identified as (a1, b1) at a first timing, and the first coordinate value may be identified as (a2, b2) at a second timing. For example, the wearable device 101 may identify the second coordinate value of the pointer 510 in the screen 110. For example, when the second coordinate value is identified as (c1, d2) at the first timing, the wearable device 101 may identify the second coordinate value at the second timing, based on the second coordinate value at the first timing and a change in the first coordinate value. An operation of identifying the second coordinate value at the second timing based on the second coordinate value at the first timing and a change in the first coordinate value may be performed using Equation 1 to be described later. In the first coordinate value and the second coordinate value identified at the first timing and the second timing, a1 may be greater than a2 and b1 may be greater than b2. A state in which a1 is greater than a2 and b1 is greater than b2 may be a state in which the external object moved to left and up is identified.

According to an embodiment, the wearable device 101 may identify a distance between each of edges 521, 522, 523, and 524 of the screen and the pointer 510, based on the first coordinate value. For example, a distance between a first edge 521 and the pointer 510 may be identified as x2. For example, a distance between a second edge 522 and the pointer 510 may be identified as y2. For example, a distance between a third edge 523 and the pointer 510 may be identified as u2. For example, a distance between a fourth edge 524 and the pointer 510 may be identified as v2. For example, the first edge 521 may be an upper edge of the screen 110, the second edge 522 may be a left edge of the screen 110, the third edge 523 may be a lower edge of the screen 110, and the fourth edge 524 may be a right edge of the screen.

$$(c2, d2) = \left(c1 + (a2 - a1) \times \left(\frac{x2}{x1}\right), d1 + (b2 - b1) \times \left(\frac{y2}{y1}\right)\right) \quad \text{Equation 1}$$

Referring to Equation 1, a second coordinate value of a portion of the external object at the second timing may be identified according to a ratio of x1 and x2, and a ratio of y1 and y2. For example, the wearable device 101 obtain the second coordinate value by using Equation 1 and correct moving distance of the pointer 510. The wearable device 101 may repeatedly identify the (c2, d2). When the (c2, d2) are repeatedly identified, the first coordinate value and the second coordinate value of the pointer 510 displayed on the screen 110 may match. An operation of obtaining (c2, d2) may be applied differently according to the location of the pointer 510 within the screen 110. For example, when the location of the pointer 510 is within an area including a center point of the screen 110, the wearable device 101 may obtain the (c2, d2) without using the ratio of the x1 and the x2. For example, when the location of the pointer 510 is within a preset distance from each of the edges 521, 522, 523, and 524 of the screen, the wearable device 101 may obtain the (c2, d2) by using the ratio of the x1 and the x2.

As described above, according to an embodiment, the wearable device 101 may recognize a touch input at a location desired by the user, by identifying a coordinate value of an external object to be identified on the second surface based on the location of the pointer 510.

Figure 6A:
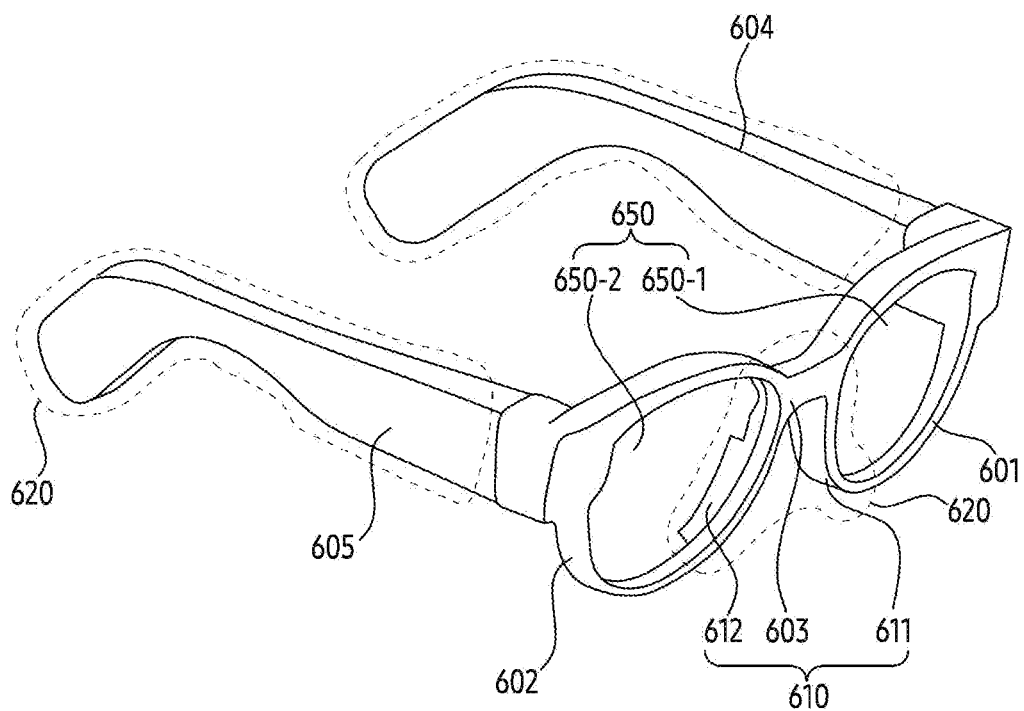
FIG. 6A illustrates an example of a perspective view of a wearable device, according to an embodiment of the disclosure.
Figure 6B:
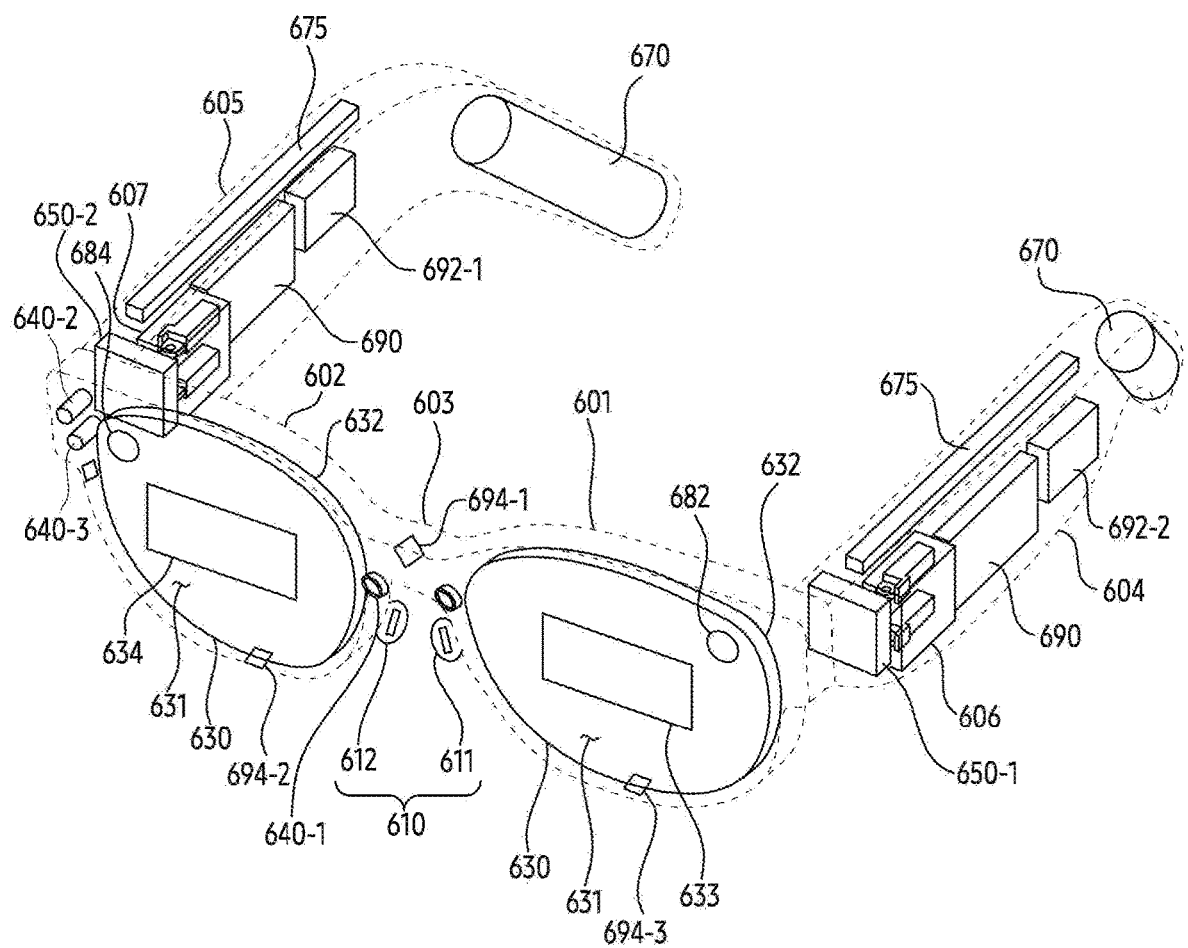
FIG. 6B illustrates an example of one or more hardware disposed in a wearable device, according to an embodiment of the disclosure.

FIG. 6A illustrates an example of a perspective view of a wearable device, according to an embodiment of the disclosure. FIG. 6B illustrates an example of one or more hardware disposed in a wearable device, according to an embodiment of the disclosure. A wearable device 600 of FIGS. 6A and 6B may include the wearable device 101 of FIGS. 1A, 1B, 2A, 3B, 4 and/or 5.

Referring to FIG. 6A, a wearable device 600 according to an embodiment may include at least one display 650 and a frame supporting the at least one display 650.

According to an embodiment, the wearable device 600 may be wearable on a portion of the user's body. The wearable device 600 may provide augmented reality (AR), virtual reality (VR), or mixed reality (MR) combining the augmented reality and the virtual reality to a user wearing the wearable device 600. For example, the wearable device 600 may output a virtual reality image to a user through the at least one display 650 in response to a user's preset gesture obtained through a motion recognition camera 640-2 of FIG. 6B.

According to an embodiment, the at least one display 650 in the wearable device 600 may provide visual information to a user. The at least one display 650 may include the display 230 of FIG. 2. For example, the at least one display 650 may include a transparent or translucent lens. The at least one display 650 may include a first display 650-1 and/or a second display 650-2 spaced apart from the first display 650-1. For example, the first display 650-1 and the second display 650-2 may be disposed at positions corresponding to the user's left and right eyes, respectively.

Referring to FIG. 6B, the at least one display 650 may provide another visual information, which is distinct from the visual information, together with the visual information included in the ambient light passing through the lens 630, a user wearing the wearable device 600, by forming a displaying area on the lens 630. The lens 630 may be formed based on at least one of a fresnel lens, a pancake lens, or a multi-channel lens. For example, the displaying area formed by the at least one display 650 may be formed on the second surface 632 among the first surface 631 and the second surface 632 of the lens 630. When the user wears the wearable device 600, the ambient light may be transmitted to the user by being incident on the first surface 631 and being penetrated through the second surface 632. For another example, the at least one display 650 may display the virtual reality image to be combined with a real screen transmitted through the ambient light. The virtual reality image outputted from the at least one display 650 may be transmitted to the user's eyes through the one or more hardware (e.g., optical devices 682 and 684, and/or at least one waveguides 633 and 634)) included in the wearable device 600.

According to an embodiment, the wearable device 600 may include the waveguides 633 and 634 that diffracts light transmitted from the at least one display 650 and relayed by the optical devices 682 and 684 and transmits it to the user. The waveguides 633 and 634 may be formed based on at least one of glass, plastic, or polymer. A nano pattern may be formed on at least a portion of the outside or inside of the waveguides 633 and 634. The nano pattern may be formed based on a grating structure having a polygonal or curved shape. Light incident to one end of the waveguides 633 and 634 may be propagated to the other end of the waveguides 633 and 634 by the nano pattern. The waveguides 633 and 634 may include at least one of at least one diffraction element (e.g., a diffractive optical element (DOE), a holographic optical element (HOE)), and a reflection element (e.g., a reflection mirror). For example, the waveguides 633 and 634 may be disposed in the wearable device 600 to guide a screen displayed by the at least one display 650 to the user's eyes. For example, the screen may be transmitted to the user's eyes based on total internal reflection (TIR) generated in the waveguides 633 and 634.

According to an embodiment, the wearable device 600 may analyze an object included in a real image collected through a photographing camera 640-1, combine virtual object corresponding to an object that become a subject of augmented reality provision among the analyzed object, and display them on the at least one display 650. The virtual object may include at least one of text and images for various information associated with the object included in the real image. The wearable device 600 may analyze the object based on a multi-camera such as a stereo camera. For the object analysis, the wearable device 600 may execute time-of-flight (ToF) and/or simultaneous localization and mapping (SLAM) supported by the multi-camera. The user wearing the wearable device 600 may watch an image displayed on the at least one display 650.

According to an embodiment, the frame may be configured with a physical structure in which the wearable device 600 may be worn on the user's body. According to an embodiment, the frame may be configured so that when the user wears the wearable device 600, the first display 650-1 and the second display 650-2 may be positioned corresponding to the user's left and right eyes. The frame may support the at least one display 650. For example, the frame may support the first display 650-1 and the second display 650-2 to be positioned at positions corresponding to the user's left and right eyes.

Referring to FIG. 6A, according to an embodiment, the frame may include an area 620 at least partially in contact with the portion of the user's body in case that the user wears the wearable device 600. For example, the area 620 in contact with the portion of the user's body of the frame may include an area contacting a portion of the user's nose, a portion of the user's ear, and a portion of the side of the user's face that the wearable device 600 contacts. According to an embodiment, the frame may include a nose pad 610 that is contacted on the portion of the user's body. When the wearable device 600 is worn by the user, the nose pad 610 may be contacted on the portion of the user's nose. The frame may include a first temple 604 and a second temple 605 that is contacted on another portion of the user's body that is distinct from the portion of the user's body.

For example, the frame may include a first rim 601 surrounding at least a portion of the first display 650-1, a second rim 602 surrounding at least a portion of the second display 650-2, a bridge 603 disposed between the first rim 601 and the second rim 602, a first pad 611 disposed along a portion of the edge of the first rim 601 from one end of the bridge 603, a second pad 612 disposed along a portion of the edge of the second rim 602 from the other end of the bridge 603, the first temple 604 extending from the first rim 601 and fixed to a portion of the wearer's ear, and the second temple 605 extending from the second rim 602 and fixed to a portion of the ear opposite to the ear. The first pad 611 and the second pad 612 may be in contact with the portion of the user's nose, and the first temple 604 and the second temple 605 may be in contact with a portion of the user's face and the portion of the user's ear. The temples 604 and 605 may be rotatably connected to the rim through hinge units 606 and 607 of FIG. 6B. The first temple 604 may be rotatably connected with respect to the first rim 601 through the first hinge unit 606 disposed between the first rim 601 and the first temple 604. The second temple 605 may be rotatably connected with respect to the second rim 602 through the second hinge unit 607 disposed between the second rim 602 and the second temple 605. According to an embodiment, the wearable device 600 may identify an external object (e.g., a user's fingertip) touching the frame and/or a gesture performed by the external object by using a touch sensor, a grip sensor, and/or a proximity sensor formed on at least a portion of the surface of the frame.

According to an embodiment, the wearable device 600 may include hardware (e.g., hardware described above based on the block diagram of FIG. 2) that performs various functions. For example, the hardware may include a battery module 670, an antenna module 675, the optical devices 682 and 684, speakers 692-1 and 692-2, microphones 694-1, 694-2, and 694-3, a light emitting module (not illustrated), and/or a printed circuit board (PCB) 690. Various hardware may be disposed in the frame.

According to an embodiment, the microphone 694-1, 694-2, and 694-3 of the wearable device 600 may obtain a sound signal, by being disposed on at least a portion of the frame. The first microphone 694-1 disposed on the nose pad 610, the second microphone 694-2 disposed on the second rim 602, and the third microphone 694-3 disposed on the first rim 601 are illustrated in FIG. 6B, but the number and disposition of the microphone 694 are not limited to an embodiment of FIG. 6B. In case that the number of the microphone 694 included in the wearable device 600 is two or more, the wearable device 600 may identify the direction of the sound signal by using a plurality of microphones disposed on different portions of the frame.

According to an embodiment, the optical devices 682 and 684 may transmit the virtual object transmitted from the at least one display 650 to the waveguides 633 and 634. For example, the optical devices 682 and 684 may be a projector. The optical devices 682 and 684 may be disposed adjacent to the at least one display 650 or may be included in the at least one display 650 as portion of the at least one display 650. The first optical device 682 may correspond to the first display 650-1, and the second optical device 684 may correspond to the second display 650-2. The first optical device 682 may transmit the light outputted from the first display 650-1 to the first waveguide 633, and the second optical device 684 may transmit light outputted from the second display 650-2 to the second waveguide 634.

In an embodiment, a camera 640 may include an eye tracking camera (ET CAM) 640-1, the motion recognition camera 640-2, and/or the photographing camera 640-3. The photographing camera 640-3, the eye tracking camera 640-1, and the motion recognition camera 640-2 may be disposed at different positions on the frame and may perform different functions. The photographing camera 640-3, the eye tracking camera 640-1, and the motion recognition camera 640-2 may be an example of the camera 225 of FIG. 2. The eye tracking camera 640-1 may output data indicating the gaze of the user wearing the wearable device 600. For example, the wearable device 600 may detect the gaze from an image including the user's pupil obtained through the eye tracking camera 640-1. An example in which the eye tracking camera 640-1 is disposed toward the user's right eye is illustrated in FIG. 6B, but the embodiment is not limited thereto, and the eye tracking camera 640-1 may be disposed alone toward the user's left eye or may be disposed toward two eyes.

In an embodiment, the photographing camera 640-3 may photograph a real image or background to be matched with a virtual image in order to implement the augmented reality or mixed reality content. The photographing camera may photograph an image of a specific object existing at a position viewed by the user and may provide the image to the at least one display 650. The at least one display 650 may display one image in which a virtual image provided through the optical devices 682 and 684 is overlapped with information on the real image or background including an image of the specific object obtained by using the photographing camera. In an embodiment, the photographing camera may be disposed on the bridge 603 disposed between the first rim 601 and the second rim 602.

In an embodiment, the eye tracking camera 640-1 may implement a more realistic augmented reality by matching the user's gaze with the visual information provided on the at least one display 650 by tracking the gaze of the user wearing the wearable device 600. For example, when the user looks at the front, the wearable device 600 may naturally display environment information associated with the user's front on the at least one display 650 at the position where the user is positioned. The eye tracking camera 640-1 may be configured to capture an image of the user's pupil in order to determine the user's gaze. For example, the eye tracking camera 640-1 may receive gaze detection light reflected from the user's pupil and may track the user's gaze based on the position and movement of the received gaze detection light. In an embodiment, the eye tracking camera 640-1 may be disposed at a position corresponding to the user's left and right eyes. For example, the eye tracking camera 640-1 may be disposed in the first rim 601 and/or the second rim 602 to face the direction in which the user wearing the wearable device 600 is positioned.

In an embodiment, the motion recognition camera 640-2 may provide a specific event to the screen provided on the at least one display 650 by recognizing the movement of the whole or portion of the user's body, such as the user's torso, hand, or face. The motion recognition camera 640-2 may obtain a signal corresponding to the gesture by recognizing the user's gesture, and may provide a display corresponding to the signal to the at least one display 650. The processor may identify a signal corresponding to the operation and may perform a preset function based on the identification. In an embodiment, the motion recognition camera 640-2 may be disposed on the first rim 601 and/or the second rim 602.

In an embodiment, the camera 640 included in the wearable device 600 is not limited to the above-described eye tracking camera (ET CAM) 640-1 and motion recognition camera 640-2. For example, the wearable device 600 may identify an external object included in the field of view (FoV), by using the photographing camera 640-3 disposed toward the user's FoV. That the wearable device 600 identifies the external object may be performed based on a sensor for identifying a distance between the wearable device 600 and the external object, such as a depth sensor and/or a time of flight (ToF) sensor. The camera 640 disposed toward the FoV may support an autofocus function and/or an optical image stabilization (OIS) function. For example, the wearable device 600 may include the camera 640 (e.g., a face tracking (FT) camera) disposed toward the face, in order to obtain an image including the face of the user wearing the wearable device 600.

Although not illustrated, the wearable device 600 according to an embodiment may further include a light source (e.g., LED) that emits light toward a subject (e.g., user's eyes, face, and/or an external object in the FoV) photographed by using the camera 640. The light source may include an LED having an infrared wavelength. The light source may be disposed on at least one of the frame, and the hinge units 606 and 607.

According to an embodiment, the battery module 670 may supply power to electronic components of the wearable device 600. In an embodiment, the battery module 670 may be disposed in the first temple 604 and/or the second temple 605. For example, the battery module 670 may be a plurality of battery modules 670. The plurality of battery modules 670, respectively, may be disposed on each of the first temple 604 and the second temple 605. In an embodiment, the battery module 670 may be disposed at an end of the first temple 604 and/or the second temple 605.

In an embodiment, the antenna module 675 may transmit the signal or power to the outside of the wearable device 600 or may receive the signal or power from the outside. The antenna module 675 may be electronically and/or operably connected to a communication circuit of the wearable device 600. In an embodiment, the antenna module 675 may be disposed in the first temple 604 and/or the second temple 605. For example, the antenna module 675 may be disposed close to one surface of the first temple 604 and/or the second temple 605.

In an embodiment, the speakers 692-1 and 692-2 may output a sound signal to the outside of the wearable device 600. A sound output module may be referred to as a speaker. In an embodiment, the speakers 692-1 and 692-2 may be disposed in the first temple 604 and/or the second temple 605 in order to be disposed adjacent to the ear of the user wearing the wearable device 600. For example, the wearable device 600 may include the second speaker 692-2 disposed adjacent to the user's left ear by being disposed in the first temple 604, and the first speaker 692-1 disposed adjacent to the user's right ear by being disposed in the second temple 605.

In an embodiment, the light emitting module (not illustrated) may include at least one light emitting element. The light emitting module may emit light of a color corresponding to a specific state or may emit light through an operation corresponding to the specific state in order to visually provide information on a specific state of the wearable device 600 to the user. For example, in case that the wearable device 600 needs charging, it may repeatedly emit red light at a preset timing. In an embodiment, the light emitting module may be disposed on the first rim 601 and/or the second rim 602.

Referring to FIG. 6B, according to an embodiment, the wearable device 600 may include the PCB 690. The PCB 690 may be included in at least one of the first temple 604 or the second temple 605. The PCB 690 may include an interposer disposed between at least two sub PCBs. On the PCB 690, one or more hardware (e.g., hardware illustrated by the blocks described above with reference to FIG. 2) included in the wearable device 600 may be disposed. The wearable device 600 may include a flexible PCB (FPCB) for interconnecting the hardware.

According to an embodiment, the wearable device 600 may include at least one of a gyro sensor, a gravity sensor, and/or an acceleration sensor for detecting the posture of the wearable device 600 and/or the posture of a body part (e.g., a head) of the user wearing the wearable device 600. Each of the gravity sensor and the acceleration sensor may measure gravity acceleration, and/or acceleration based on preset 6-dimensional axes (e.g., x-axis, y-axis, and z-axis) perpendicular to each other. The gyro sensor may measure angular velocity of each of preset 6-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 600 may identify the user's motion and/or gesture performed to execute or stop a specific function of the wearable device 600 based on the IMU.

As described above, according to an embodiment, the wearable device 600 may display a first virtual object corresponding to a user of an external electronic device while providing a screen related to a virtual reality service through the display 650. The wearable device 600 may identify a distance between the first virtual object and the second virtual object corresponding to the user of the wearable device 600. The wearable device 600 may activate cameras 640-1 and 640-2 based on the distance between the first virtual object and the second virtual object within a reference distance. The wearable device 600 may identify a state of the user based on at least one image obtained using the activated cameras 640-1 and 640-2. In response to identifying the state of the user, the wearable device 600 may transmit data for changing a state of the second virtual object corresponding to the user of the wearable device 600 displayed through a display of the external electronic device, based on the user's state, to the external electronic device. The wearable device 600 may enhance the user experience of the wearable device 600 and the external electronic device by transmitting data for changing the state of the second virtual object based on the at least one image.

Figure 7A:
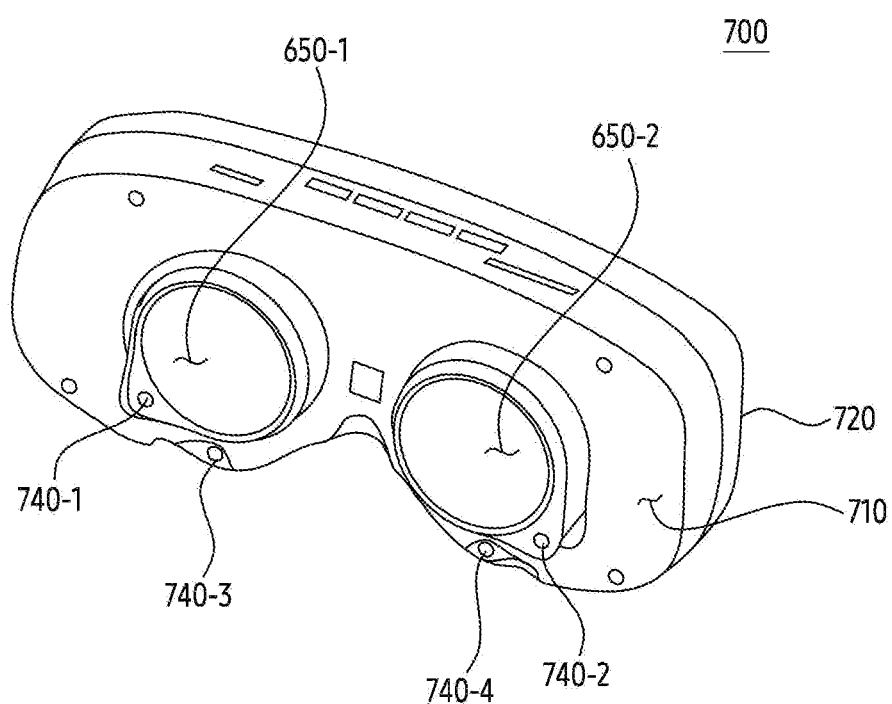
FIGS. 7A and 7B illustrate an example of an exterior of a wearable device, according to various embodiments of the disclosure.
Figure 7B:
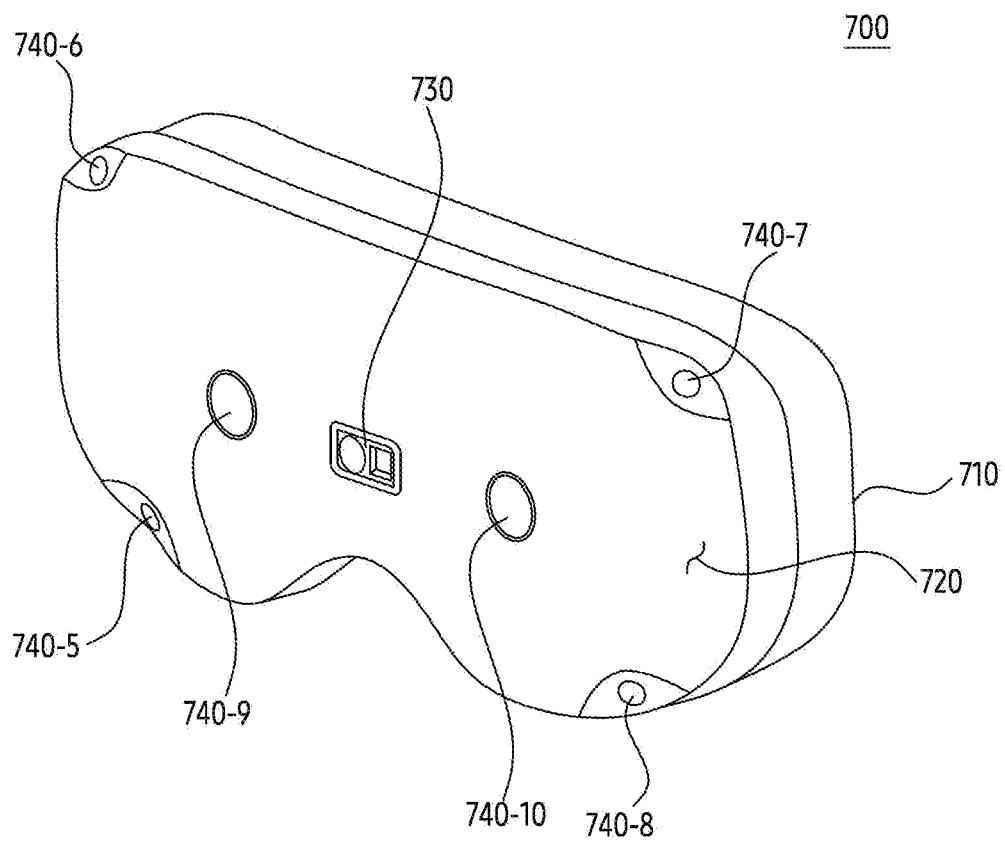

FIGS. 7A and 7B illustrate an example of an exterior of a wearable device, according to an embodiment of the disclosure. A wearable device 700 of FIGS. and to 7B may include the wearable device 101 of FIGS. 1A, 1B, 2, 3A, 3B, 4, and/or 5. The wearable device 700 of FIGS. 7A and 7B may include the wearable device 600 of FIGS. 6A and 6B. According to an embodiment, an example of an exterior of a first surface 710 of a housing of the wearable device 700 may be illustrated in FIG. 7A, and an example of an exterior of a second surface 720 opposite to the first surface 710 may be illustrated in FIG. 7B.

Referring to FIG. 7A, according to an embodiment, the first surface 710 of the wearable device 700 may have a form attachable on a body part of a user (e.g., the user's face). Although not illustrated, the wearable device 700 may further include a strap for being fixed on the user's body part, and/or one or more temples (e.g., the first temple 604 and/or the second temple 605 of FIGS. 6A and 6B). A first display 650-1 for outputting an image to the left eye among two eyes of the user and a second display 650-2 for outputting an image to the right eye among two eyes may be positioned on the first surface 710. The wearable device 700 may further include rubber or silicone packing to prevent interference by light (e.g., ambient light) different from light emitted from the first display 650-1 and the second display 650-2, formed on the first surface 710.

According to an embodiment, the wearable device 700 may include cameras 740-1 and 740-2 for photographing and/or tracking two eyes of a user adjacent to each of the first display 650-1 and the second display 650-2. The cameras 740-1 and 740-2 may be referred to as ET cameras. According to an embodiment, the wearable device 700 may include cameras 740-3 and 740-4 for photographing and/or recognizing a face of the user. The cameras 740-3 and 740-4 may be referred to as FT cameras.

Referring to FIG. 7B, cameras (e.g., cameras 740-5, 740-6, 740-7, 740-8, 740-9, 740-10) and/or a sensor (e.g., a depth sensors 730) for obtaining information related to external environment of the wearable device 700 may be positioned on the second surface 720 opposite to the first surface 710 of FIG. 7A. For example, cameras 740-5, 740-6, 740-7, 740-8, 740-9, and 740-10 may be positioned on the second surface 720 to recognize an external object different from the wearable device 700. For example, the wearable device 700 may obtain an image and/or media to be transmitted to each of the user's two eyes, by using cameras 740-9 and 740-10. The camera 740-9 may be positioned on the second surface 720 of the wearable device 700 to obtain an image to be displayed through the second display 650-2 corresponding to the right eye from among the two eyes. The camera 740-10 may be positioned on the second surface 720 of the wearable device 700 to obtain an image to be displayed through the first display 650-1 corresponding to the left eye from among the two eyes.

According to an embodiment, the wearable device 700 may include a depth sensor 730 positioned on the second surface 720 to identify a distance between the wearable device 700 and an external object. The wearable device 700 may obtain spatial information (e.g., depth map) on at least a portion of FoV of a user wearing the wearable device 700, by using the depth sensor 730.

Although not illustrated, a microphone may be positioned on the second surface 720 of the wearable device 700 to obtain sound outputted from an external object. The number of microphones may be one or more according to the embodiment.

Figure 8:
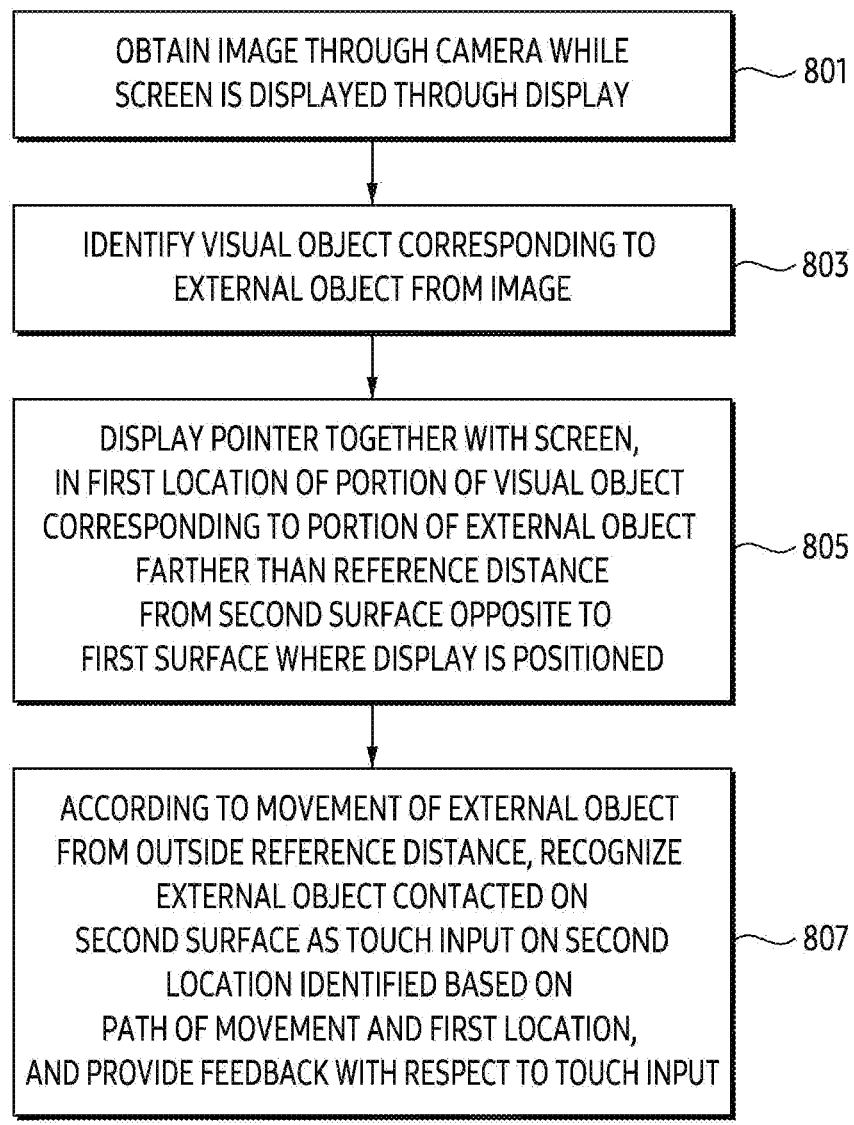
FIG. 8 illustrates an example of a flowchart of an operation of a wearable device, according to an embodiment of the disclosure.

FIG. 8 illustrates an example of a flowchart of an operation of a wearable device, according to an embodiment of the disclosure. A wearable device of FIG. 8 may include the wearable device 101 of FIGS. 1A, 1B, 2, 3A, 3B, 4, and/or 5. The wearable device of FIG. 8 may include the wearable device 600 of FIGS. 6A and 6B, and/or the wearable device 700 of FIGS. 7A and 7B. Operations of FIG. 8 may be performed by the processor 210 of FIG. 2.

Referring to FIG. 8, according to an embodiment, in operation 801, a processor (e.g., the processor 210 of FIG. 2) of the wearable device may display a screen (e.g., the screen 110 of FIG. 1A and/or the screen 110 of FIG. 1B) through a display (e.g., the display 230 of FIG. 2). For example, the display may be positioned on a first surface of a housing of the wearable device. For example, the first surface may be a direction facing a user while the wearable device is worn on the user. For example, the screen may include a screen representing a virtual space. For example, the screen may include a screen representing an image obtained through a camera. The processor may obtain an image through a camera (e.g., the camera 240 of FIG. 2). The processor may obtain an image through the camera while the screen is displayed through the display.

According to an embodiment, in operation 803, the processor may identify a visual object corresponding to an external object from an image obtained through a camera. For example, the external object may include a user's hand. For example, the external object may include a digital pen.

According to an embodiment, in operation 805, the processor may identify a portion of a visual object corresponding to a portion of the external object farther than the reference distance from a second surface opposite to a first surface on which a display is positioned. For example, the reference distance may be set as a distance between the user's eyes and the first surface of the wearable device. The processor may identify a first location of a portion of the visual object. For example, the portion of the external object may include a user's finger (or fingertip). The processor may display a pointer (e.g., the pointer 125 of FIGS. 1A and/or 1B) together with a screen, in the first location of the visual object.

According to an embodiment, in operation 807, the processor may identify the external object in contact with the second surface according to movement of the external object from outside the reference distance. For example, the processor may identify an external object contacted on the second surface by using a sensor (e.g., the sensor 250 of FIG. 2). The processor may recognize the external object contacted on the second surface as a touch input at a second location identified based on the first location and a path of movement. The processor may recognize a touch input at the second location and provide feedback with respect to the touch input.

For example, the processor may identify an external object within a reference distance from the second surface. The processor may identify the second location based on a third location of a portion of the external object within a reference distance from the second surface. For example, the processor may convert a coordinate value of the portion of the external object identified in the third location to a coordinate value of the second location. The processor may identify the portion of the external object based on the converted coordinate value and display a pointer to a location corresponding to the coordinate value.

As described above, according to an embodiment, the processor of the wearable device may recognize a touch input at the second location and provide feedback with respect to the touch input, based on the first location of the portion of the visual object and a path of movement of the external object. The processor may provide feedback with respect to the touch input at a location desired by the user by recognizing the touch input at the second location, based on the first location and the path of movement.

Figure 9:
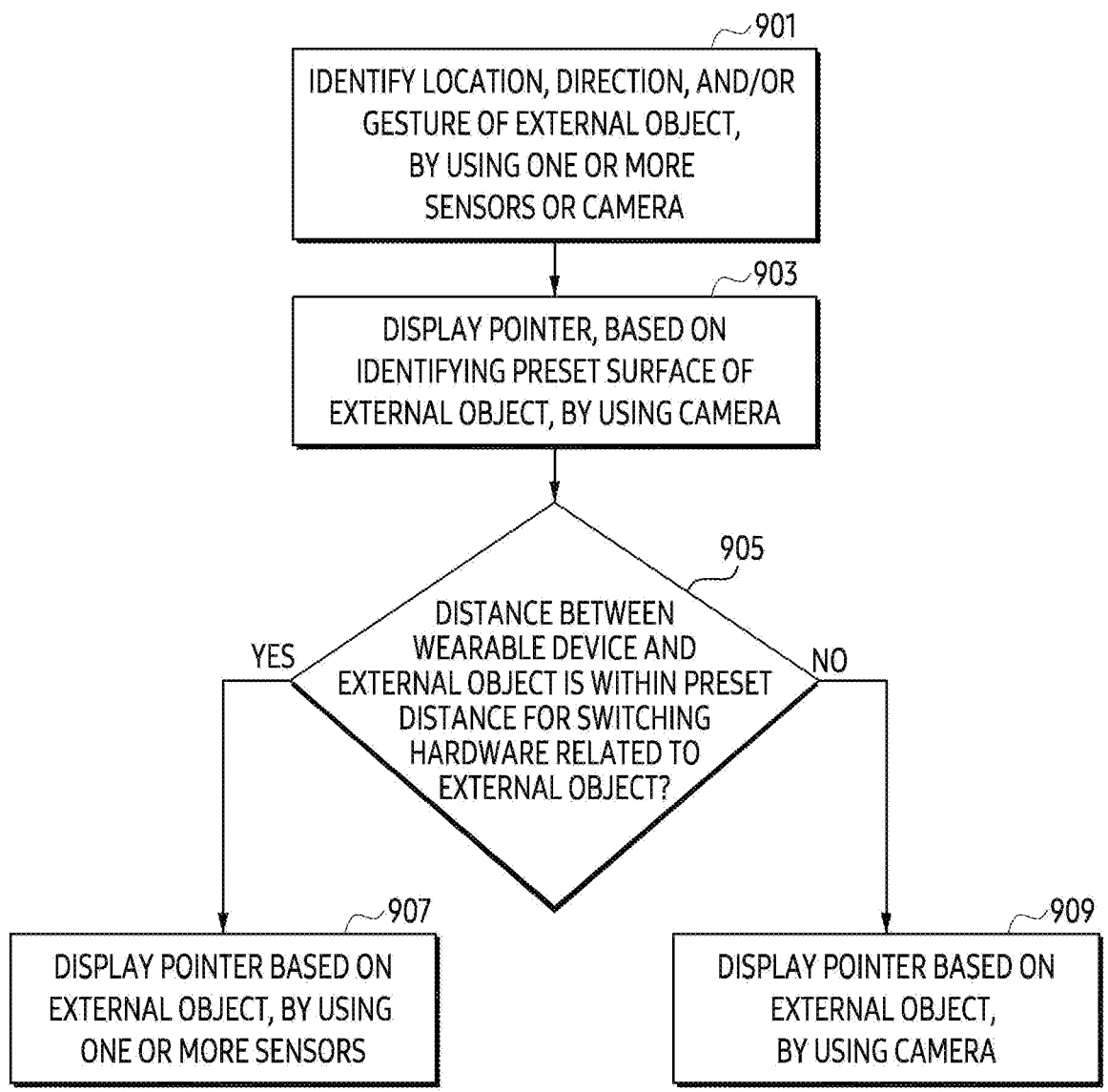
FIG. 9 illustrates an example of a flowchart of an operation of a wearable device, according to an embodiment of the disclosure.

FIG. 9 illustrates an example of a flowchart of an operation of a wearable device, according to an embodiment of the disclosure. A wearable device of FIG. 8 may include the wearable device 101 of FIGS. 1A, 1B, 2, 3A, 3B, 4, and/or 5, and/or the wearable device of FIG. 8. The wearable device of FIG. 9 may include the wearable device 600 of FIGS. 6A and 6B, and/or the wearable device 700 of FIGS. 7A and 7B. Operations of FIG. 9 may be performed by the processor 210 of FIG. 2.

Referring to FIG. 9, according to an embodiment, in operation 901, a processor (e.g., the processor 210 of FIG. 2) of a wearable device may identify an external object (e.g., the external object 105 of FIGS. 1A and/or 1B) using one or more sensors (e.g., the sensor 250 of FIG. 2) or a camera (e.g., the camera 240 of FIG. 2). For example, the processor may identify a location, a direction, and/or a gesture of the external object, by using the one or more sensors or the camera. For example, operation of identifying an external object using the camera may include identifying a visual object corresponding to the external object within an image obtained through the camera. For example, the gesture may include an air gesture of the external object.

According to an embodiment, in operation 903, the processor may identify a preset surface of an external object by using a camera, from among one or more sensors or the camera. For example, the processor may identify a visual object corresponding to the external object within an image obtained through the camera. The processor may identify the preset surface of the external object based on identifying the preset surface of the visual object. For example, the preset surface of the external object may include a surface corresponding to the user's palm when the external object is the user's hand. The processor may display a pointer based on identifying the preset surface of the external object. For example, the pointer may be displayed in a location of a portion of a visual object corresponding to a portion of an external object. For example, the processor may move a virtual object providing feedback on a touch input to a distance selectable by the pointer, based on displaying the pointer.

According to an embodiment, in operation 905, the processor may identify a distance between a wearable device and an external object, in a state of displaying a pointer. For example, a distance between the wearable device and the external object may include a distance between the second surface of the wearable device and the external object. The processor may identify the distance based on one or more sensors (e.g., the sensor 250 of FIG. 2) and/or a camera (e.g., the camera 240 of FIG. 2). The processor may identify whether a distance between a wearable device and an external object is within a preset distance (e.g., the reference distance) for switching hardware (e.g., the sensor 250 and/or the camera 240 of FIG. 2, which are hardware for identifying and/or tracking an external object) related to the external object, in a state of displaying the pointer.

According to an embodiment, in operation 907, when a distance between a wearable device and an external object is within a reference distance (905—YES), the processor may display a pointer based on the external object by using one or more sensors. For example, the processor may display the pointer based on a location of a portion of the external object.

According to an embodiment, in operation 909, when the distance between the wearable device and the external object is outside the reference distance (905—NO), the processor may display a pointer based on the external object using a camera. For example, the processor may identify a visual object corresponding to the external object within an image obtained through the camera. The processor may display the pointer based on a location of a portion of a visual object corresponding to the portion of the external object.

As described above, according to an embodiment, a processor of a wearable device may identify an external object according to a distance between the wearable device and the external object, by using different hardware components. According to the distance, the processor may identify an external object by using different hardware components and display a pointer in a location of a portion of the external object.

A method for recognizing a touch input on a second surface different from a first surface on which a display is positioned may be required. As described above, according to an embodiment, a wearable device 101 may comprise a housing, memory 220 storing one or more programs, a processor 210, a display 230 positioned on a first surface 131 of the housing, a camera positioned toward a direction different from a direction of the display 230. The one or more programs may include instructions that, when executed by the processor 210, cause the wearable device 101 to obtain, while a screen 110 is displayed on the display, an image by using the camera. The one or more programs may include instructions that, when executed by the processor 210, cause the wearable device 101 to identify a visual object 120 corresponding to an external object 105 from the image. The one or more programs may include instructions that, when executed by the processor 210, cause the wearable device 101 to display, at a first location of a portion of the visual object 120 corresponding to a portion of the external object 105 farther than a reference distance d1 from a second surface 132 opposite to the first surface 131, a pointer 125 on the screen 110. The one or more programs may include instructions that, when executed by the processor 210, cause the wearable device 101 to recognize the external object 105 contacted on the second surface 132 according to movement of the external object 105 from outside the reference distance d1, as a touch input at a second location identified based on a path of the movement and the first location, and provide feedback with respect to the touch input.

According to an embodiment, the wearable device 101 may comprise one or more sensors for identifying the external object 105 on the second surface 132. The one or more programs may include instructions that, when executed by the processor 210, cause the wearable device 101 to identify the external object 105 inside of the reference distance d1 from the second surface 132 by using the one or more sensors. The one or more programs may include instructions that, when executed by the processor 210, cause the wearable device 101 to identify the second location based on a third location of the portion of the external object 105 within the reference distance d1.

According to an embodiment, the one or more programs may include instructions that, when executed by the processor 210, cause the wearable device 101 to adjust a transparency of the screen 110 based on a distance from the second surface 132 to the external object 105 and maintain brightness of the pointer 125.

According to an embodiment, the one or more programs may include instructions that, when executed by the processor 210, cause the wearable device 101 to identify the first location by using the camera within a preset distance from the reference distance d1. The one or more programs may include instructions that, when executed by the processor 210, cause the wearable device 101 to identify the third location by using the one or more sensors. The one or more programs may include instructions that, when executed by the processor 210, cause the wearable device 101 to identify the second location based on the third location and the first location.

According to an embodiment, the one or more programs may include instructions that, when executed by the processor 210, cause the wearable device 101 to move, based on displaying the pointer 125, a virtual object providing the feedback with respect to the touch input, to a distance able to be selected by the pointer 125.

According to an embodiment, the one or more programs may include instructions that, when executed by the processor 210, cause the wearable device 101 to adjust the reference distance d1 based on brightness of the visual object 120.

According to an embodiment, the one or more programs may include instructions that, when executed by the processor 210, cause the wearable device 101 to initiate, based on identifying the visual object 120 corresponding to a preset third surface of the external object 105, displaying of the pointer 125 in the image.

According to an embodiment, the one or more programs may include instructions that, when executed by the processor 210, cause the wearable device 101 to cease to display the pointer 125, based on identifying the visual object 120 corresponding to a fourth surface different from the third surface of the external object 105.

According to an embodiment, a method performed by a wearable device 101 may comprise obtaining, while a screen 110 is displayed on a display 230 of the wearable device positioned on a first surface 131 of a housing of the wearable device, an image using a camera of the wearable device positioned toward a direction different from a direction of the display. The method may comprise identifying a visual object 120 corresponding to an external object 105 from the image. The method may comprise displaying, at a first location of a portion of the visual object 120 corresponding to a portion of the external object 105 farther than a reference distance d1 from a second surface 132 opposite to the first surface 131, a pointer 125 on the screen 110. The method may comprise recognizing the external object 105 contacted on the second surface 132 according to movement of the external object 105 from outside the reference distance d1, as a touch input at a second location identified based on a path of the movement and the first location, and providing feedback with respect to the touch input.

According to an embodiment, the method may comprise identifying the external object 105 inside of the reference distance d1 from the second surface 132 by using the one or more sensors of the wearable device for identifying the external object 105 on the second surface 132. The method may comprise identifying the second location based on a third location of the portion of the external object 105 within the reference distance d1.

According to an embodiment, the method may comprise adjusting a transparency of the screen 110 based on a distance from the second surface 132 to the external object 105 and maintain brightness of the pointer 125.

According to an embodiment, the method may comprise identifying the first location by using the camera within a preset distance from the reference distance d1. The method may comprise identifying the third location by using the one or more sensors. The method may comprise identifying the second location based on the third location and the first location.

According to an embodiment, the method may comprise moving, based on displaying the pointer 125, a virtual object providing the feedback with respect the touch input, to a distance able to be selected by the pointer 125.

According to an embodiment, the method may comprise adjusting the reference distance d1 based on brightness of the visual object 120.

According to an embodiment, the method may comprise initiating, based on identifying the visual object 120 corresponding to a preset third surface of the external object 105, display of the pointer 125 in the image.

According to an embodiment, the method may comprise ceasing to display the pointer 125, based on identifying the visual object 120 corresponding to a fourth surface different from the third surface of the external object 105.

As described above, according to an embodiment, one or more non-transitory computer readable storage media storing one or more programs, the one or more programs including instructions that, when executed by a processor 210 of a wearable device 101, may cause the wearable device 101 to perform operations. The operations may include obtaining, while a screen 110 is displayed on a display 230 of the wearable device positioned on a first surface 131 of a housing of the wearable device, an image using a camera of the wearable device positioned toward a direction different from a direction of the display 230. The operations may include identifying a visual object 120 corresponding to an external object 105 from the image. The operations may include displaying, at a first location of a portion of the visual object 120 corresponding to a portion of the external object 105 farther than a reference distance d1 from a second surface 132 opposite to the first surface 131, a pointer 125 on the screen 110. The operations may include recognizing the external object 105 contacted on the second surface 132 according to movement of the external object 105 from outside the reference distance d1, as a touch input at a second location identified based on a path of the movement and the first location, and providing feedback with respect to the touch input.

According to an embodiment, the operations may include identifying the external object 105 inside of the reference distance d1 from the second surface 132 based on one or more sensors of the wearable device for identifying the external object 105 on the second surface 132. The operations may include identifying the second location based on a third location of the portion of the external object 105 within the reference distance d1.

According to an embodiment, the operations may include adjusting a transparency of the screen 110 based on a distance from the second surface 132 to the external object 105 and maintain brightness of the pointer 125.

According to an embodiment, the operations may include identifying the first location by using the camera within a preset distance from the reference distance d1. The operations may include identifying the third location by using the one or more sensors. The operations may include identifying the second location based on the third location and the first location.

According to an embodiment, the operations may include moving, based on displaying the pointer 125, a virtual object providing the feedback of the touch input, to a distance able to be selected by the pointer 125.

According to an embodiment, the operations may include adjusting the reference distance d1 based on brightness of the visual object 120.

According to an embodiment, the operations may include initiating, based on identifying the visual object 120 corresponding to a preset third surface of the external object 105, displaying of the pointer 125 in the image.

According to an embodiment, the operations may include ceasing to display the pointer 125, based on identifying the visual object 120 corresponding to a fourth surface different from the third surface of the external object 105.

The apparatus described above may be implemented as a combination of hardware components, software components, and/or hardware components and software components. For example, the devices and components described in the embodiments may be implemented using one or more general purpose computers or special purpose computers such as processors, controllers, ALU, digital signal processor, microcomputers, FPGA, PLU, microprocessor, any other device capable of executing and responding to instructions. The processing device may perform an operating system (OS) and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of one or more programs including instructions that may be performed through various hardware for processing and recorded in one or more non-transitory computer-readable storage media. In this case, the one or more non-transitory computer-readable storage media may continuously or temporarily store the one or more programs for execution or download. In addition, the one or more non-transitory computer-readable storage media may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as compact disc read only memories (CD-ROMs) and digital versatile discs (DVDs), magneto-optical media such as floptical disks, ROMs, RAMS, flash memories, and the like to store program instructions. Examples of other media include app stores that distribute applications, sites that supply or distribute various software, and recording media or storage media managed by servers.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A wearable device, comprising:
a housing;
memory storing one or more programs;
one or more processors;
a display positioned on a first surface of the housing; and
a camera positioned toward a direction different from a direction of the display,
wherein the one or more programs include instructions that, when executed by the one or more processors, cause the wearable device to:
obtain, while a screen is displayed on the display, an image using the camera,
identify a visual object corresponding to an external object from the image,
display, at a first location of a portion of the visual object corresponding to a portion of the external object farther than a reference distance from a second surface opposite to the first surface, a pointer on the screen, and
recognize the external object contacted on the second surface according to movement of the external object from outside the reference distance, as a touch input at a second location identified based on a path of the movement and the first location, and provide feedback with respect to the touch input.

2. The wearable device of claim 1, further comprising:
one or more sensors for identifying the external object on the second surface,
wherein the one or more programs further include instructions that, when executed by the one or more processors, cause the wearable device to:
identify the external object inside of the reference distance from the second surface by using the one or more sensors, and identify the second location based on a third location of the portion of the external object within the reference distance.

3. The wearable device of claim 2, wherein the one or more programs further include instructions that, when executed by the one or more processors, cause the wearable device to:
adjust a transparency of the screen based on a distance from the second surface to the external object and maintain brightness of the pointer.

4. The wearable device of claim 2, wherein the one or more programs further include instructions that, when executed by the one or more processors, cause the wearable device to:
identify the first location by using the camera within a preset distance from the reference distance;
identify the third location by using the one or more sensors; and
identify the second location based on the third location and the first location.

5. The wearable device of claim 2, wherein the one or more programs further include instructions that, when executed by the one or more processors, cause the wearable device to:
switch between using the camera and using the one or more sensors to identify distance of the external object from the second surface based on the external object being a preset distance from the second surface.

6. The wearable device of claim 1, wherein the one or more programs further include instructions that, when executed by the one or more processors, cause the wearable device to:
move, based on displaying the pointer, a virtual object providing the feedback with respect to the touch input, to a distance able to be selected by the pointer.

7. The wearable device of claim 1, wherein the one or more programs further include instructions that, when executed by the one or more processors, cause the wearable device to:
adjust the reference distance based on brightness of the visual object.

8. The wearable device of claim 1, wherein the one or more programs further include instructions that, when executed by the one or more processors, cause the wearable device to:
initiate, based on identifying the visual object corresponding to a preset third surface of the external object, displaying of the pointer in the image.

9. The wearable device of claim 8, wherein the one or more programs further include instructions that, when executed by the one or more processors, cause the wearable device to:
based on identifying the visual object corresponding to a fourth surface different from the third surface of the external object, cease to display the pointer.

10. A method performed by a wearable device, the method comprising:
obtaining, while a screen is displayed on a display of the wearable device positioned on a first surface of a housing of the wearable device, an image using a camera of the wearable device positioned toward a direction different from a direction of the display;
identifying a visual object corresponding to an external object from the image;
displaying, at a first location of a portion of the visual object corresponding to a portion of the external object farther than a reference distance from a second surface opposite to the first surface, a pointer on the screen; and
recognizing the external object contacted on the second surface according to movement of the external object from outside the reference distance, as a touch input at a second location identified based on a path of the movement and the first location, and providing feedback with respect to the touch input.

11. The method of claim 10, further comprising:
identifying the external object inside of the reference distance from the second surface by using one or more sensors of the wearable device for identifying the external object on the second surface; and
identifying the second location based on a third location of the portion of the external object within the reference distance.

12. The method of claim 11, wherein the displaying of the pointer comprises:
adjusting a transparency of the screen based on a distance from the second surface to the external object and maintain brightness of the pointer.

13. The method of claim 11, wherein the identifying of the second location comprises:
identifying the first location by using the camera within a preset distance from the reference distance;
identifying the third location by using the one or more sensors; and
identifying the second location based on the third location and the first location.

14. The method of claim 11, wherein the providing comprises:
moving, based on displaying the pointer, a virtual object providing the feedback with respect to the touch input, to a distance able to be selected by the pointer.

15. The method of claim 11, further comprising:
switching between using the camera and using the one or more sensors to identify distance of the external object from the second surface based on the external object being a preset distance from the second surface.

16. The method of claim 10, further comprising:
adjusting the reference distance based on brightness of the visual object.

17. The method of claim 10, wherein the displaying of the pointer comprises:
initiating, based on identifying the visual object corresponding to a preset third surface of the external object, display of the pointer in the image.

18. The method of claim 17, further comprising:
based on identifying the visual object corresponding to a fourth surface different from the third surface of the external object, ceasing to display the pointer.

19. One or more non-transitory computer readable storage media storing one or more programs including instructions that, when executed by one or more processors of a wearable device, cause the wearable device to perform operations, the operations comprising:
obtaining, while a screen is displayed on a display of the wearable device positioned on a first surface of a housing of the wearable device, an image using a camera of the wearable device positioned toward a direction different from a direction of the display;
identifying a visual object corresponding to an external object from the image;
displaying, at a first location of a portion of the visual object corresponding to a portion of the external object farther than a reference distance from a second surface opposite to the first surface, a pointer on the screen; and recognizing the external object contacted on the second surface according to movement of the external object from outside the reference distance, as a touch input at a second location identified based on a path of the movement and the first location, and providing feedback with respect to the touch input.

20. The one or more non-transitory computer readable storage media of claim 19, wherein the operations further comprise:
identifying the external object inside of the reference distance from the second surface by using one or more sensors of the wearable device for identifying the external object on the second surface; and
identifying the second location based on a third location of the portion of the external object within the reference distance.

* * * * *